US007898938B2

(12) United States Patent
Harada

(10) Patent No.: US 7,898,938 B2
(45) Date of Patent: Mar. 1, 2011

(54) TRANSMITTING APPARATUS AND TRANSMITTING METHOD

(75) Inventor: Tomoyuki Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 18 days.

(21) Appl. No.: 12/318,809

(22) Filed: Jan. 8, 2009

(65) Prior Publication Data
US 2009/0296720 A1 Dec. 3, 2009

(30) Foreign Application Priority Data
May 30, 2008 (JP) ............................. 2008-143744

(51) Int. Cl.
*G01R 31/08* (2006.01)
(52) U.S. Cl. ................... 370/216; 370/469; 398/1; 398/2
(58) Field of Classification Search ........................ None
See application file for complete search history.

(56) References Cited

U.S. PATENT DOCUMENTS

| 7,502,389 | B2 * | 3/2009 | Shinomiya et al. | 370/522 |
| 7,652,983 | B1 * | 1/2010 | Li et al. | 370/217 |
| 2003/0189920 | A1 * | 10/2003 | Erami et al. | 370/351 |
| 2004/0095922 | A1 * | 5/2004 | Sasagawa | 370/351 |
| 2005/0180431 | A1 * | 8/2005 | Kinoshita et al. | 370/397 |
| 2005/0259570 | A1 * | 11/2005 | Hayashi et al. | 370/216 |
| 2006/0083251 | A1 * | 4/2006 | Kataoka et al. | 370/400 |
| 2006/0221816 | A1 | 10/2006 | Nagata et al. | |
| 2007/0159964 | A1 * | 7/2007 | Suzuki et al. | 370/228 |
| 2007/0230359 | A1 * | 10/2007 | Tanaka | 370/248 |
| 2007/0274224 | A1 * | 11/2007 | Suzuki et al. | 370/248 |
| 2008/0049610 | A1 * | 2/2008 | Linwong et al. | 370/225 |
| 2008/0291924 | A1 * | 11/2008 | Ishii | 370/400 |
| 2009/0297141 | A1 * | 12/2009 | Amano et al. | 398/17 |

FOREIGN PATENT DOCUMENTS

| JP | 2005-020572 | 1/2005 |
| JP | 2006-287403 | 10/2006 |

OTHER PUBLICATIONS

L. Berger (ED), "Generalized Multi-Protocol Label Switching (GMPLS) Signaling Functional Description", Network Working Group, Jan. 2003, pp. 1-34.
L. Berger (ED), "Generalized Multi-Protocol Label Switching (GMPLS) Signaling Resource Reservation Protocol-Traffic Engineering (RSVP-TE) Extensions", Network Working Group, Jan. 2003, pp. 1-42.

* cited by examiner

*Primary Examiner*—Robert W Wilson
(74) *Attorney, Agent, or Firm*—Fujitsu Patent Center

(57) ABSTRACT

A transmitting apparatus obtains cross-connect information on an input side and an output side, reserves the information as a cross-connect for management shift, adds object information formed of that cross-connect information and others to a signaling message for transmission and reception, and also updates the reserved cross-connect for management shift to shift path management.

18 Claims, 15 Drawing Sheets

FIG.3

EXISTING-PATH-INFORMATION DATABASE

OWN Node INFORMATION

| OWN-Node ID | OWN-Node IP addr |
|---|---|
| 1.1.1.1 | 10.5.20.11 |

Link INFORMATION

| OWN-Node Link ID | FACING-Node ID | FACING-Node IP addr | FACING-Node Link ID |
|---|---|---|---|
| 1 | 2.2.2.2 | 10.5.20.12 | 2 |
| 3 | - | - | - |
| 5 | 3.3.3.3 | 10.5.20.13 | 2 |

CROSS-CONNECT INFORMATION

| FROM-SIDE Link ID | FROM-SIDE Ch | TO-SIDE Link ID | TO-SIDE Ch | BANDWIDTH |
|---|---|---|---|---|
| 1 | 7 | 3 | 1 | STS3C |
| 3 | 1 | 1 | 7 | STS3C |
| 3 | 49 | 5 | 1 | STS1 |
| 5 | 1 | 3 | 49 | STS1 |

| EXISTING RESERVE MESSAGE OBJECT | |
|---|---|
| Node ID | 1.1.1.1 |
| | 3.3.3.3 |
| Link ID | 5 |
| | 20 |
| CHANNEL INFORMATION | 1 |
| | 1 |

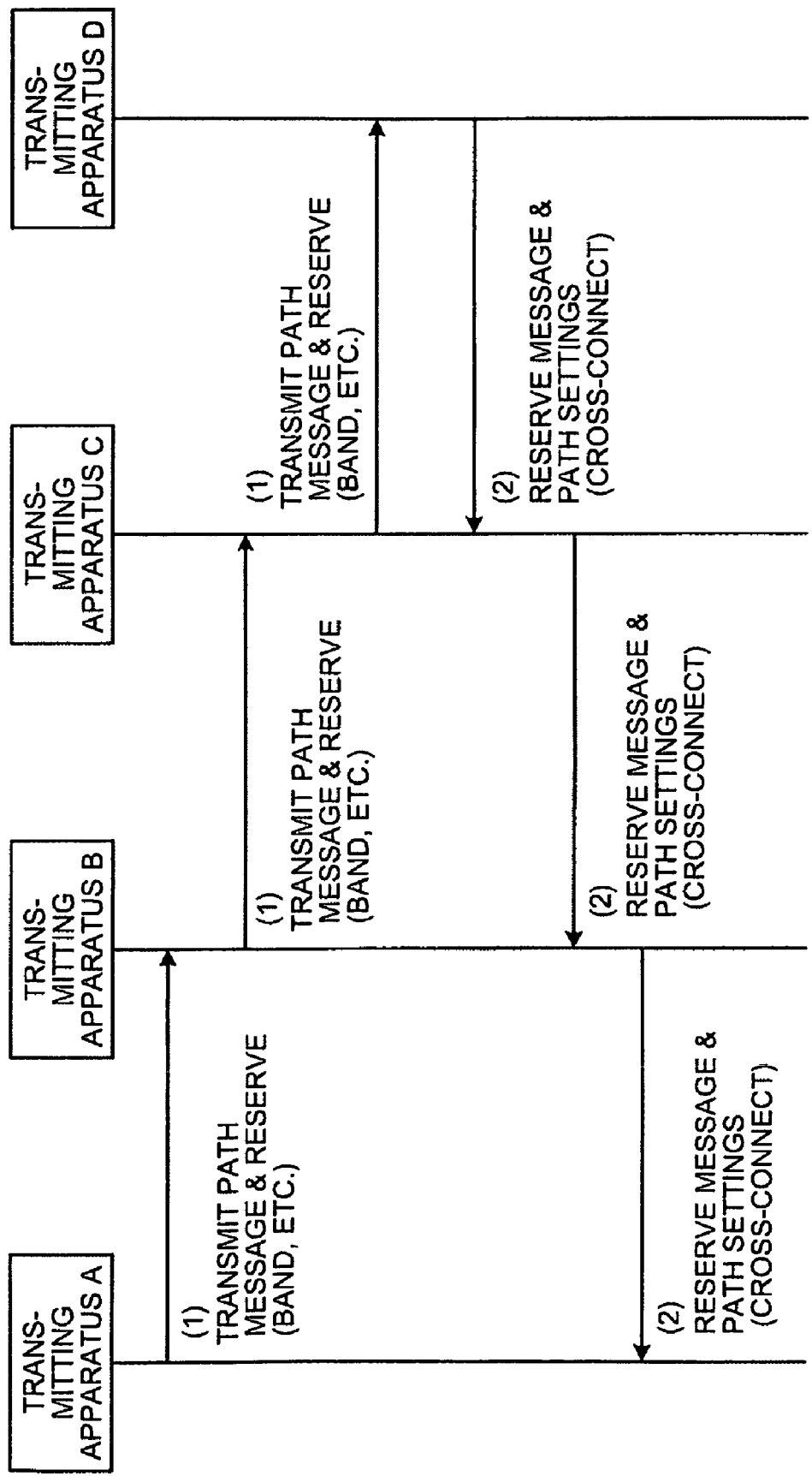

PATH MESSAGE (PathMsg)

RESERVE MESSAGE (ResvMsg)

FIG.18A
PATH MESSAGE (PathMsg)

| OBJECT NAME | DESCRIPTION |
|---|---|
| SESSION SENDER_TEMPLATE | (OBJECT) STORING IDENTIFICATION INFORMATION OF CONNECTION, ALLOWING UNIQUE IDENTIFICATION BY COMBINING FIVE PIECES OF INFORMATION (INGRESS ADDRESS, EGRESS ADDRESS, TUNNEL ID, LSP ID, EXTENDED TUNNEL ID) |
| RSVP_HOP | LOCAL ID OF TRANSMITTING-SIDE Node OF PATH MESSAGE PathMsg IS STORED AS IDENTIFICATION INFORMATION OF FIBER FOR USE |
| TIME_VALUES | REGION WHERE PATH REFRESH INTERVAL (LENGTH OF REFRESH TIMER) IS STORED. BASE ON THIS VALUE, RECEIVING SIDE DETERMINES PTTD. IN GENERAL, VALUE OF 20 SECONDS TO 30 SECONDS IS STORED |
| EXPLICIT_ROUTE | REGION WHERE INFORMATION ABOUT ROUTE THROUGH WHICH CONNECTION AND LIKE PASSES IS STORED |
| LABEL_REQUEST | REGION WHERE TYPE OF LABEL TO BE REQUESTED IS STORED, INDICATING TYPE OF CONNECTION (SDH/SONET, Ethernet (REGISTERED TRADEMARK), Lambda) |
| PROTECTION | REGION WHERE TYPE OF PROTECTION REQUESTED BY CONNECTION IS STORED, WHICH ALSO RELATES TO SEGMENT PROTECTION |
| SESSION_ATTRIBUTE | REGION WHERE NAME OF CONNECTION AND LIKE IS STORED. WHEN CONNECTION RTRV IS PERFORMED AT RELAY Node, NAME CAN BE USED TO SPECIFY CONNECTION, FOR EXAMPLE |
| ADMIN_STATUS | REGION WHERE SPECIAL INFORMATION IS STORED, SUCH AS Admin_Down AND Deletion |
| SENDER_TSPEC | REGION WHERE INFORMATION ABOUT RATE REQUESTED BY CONNECTION IS ENTERED (SUCH AS 2.5G OR 10G), INDICATING PRESENCE OR ABSENCE OF STS1/STS3c/CONCATENATION IN SONET CASE |
| UPSTREAM_LABEL | REGION WHERE RESERVED LABEL INFORMATION (INFORMATION IDENTIFYING WAVELENGTH) IS STORED |
| ALARM_SPEC | REGION WHERE TYPE OF OCCURRENCE OF ALARM AND OCCURRENCE TIME ARE STORED |
| NOTIFY_REQUEST | USED WHEN Notify Msg IS REQUESTED |

FIG.18B
RESERVE MESSAGE (ResvMsg)

| OBJECT NAME | DESCRIPTION |
|---|---|
| RESV_CONFIRM | WHEN TRANSMISSION OF ResvConfMsg IS REQUESTED, REGION WHERE INFORMATION AS SUCH IS STORED |
| FLOWSPEC | REGION WHERE IDENTIFICATION INFORMATION WITH SAME CONNECTION AS SENDER_TEMPLATE OF PATH MESSAGE PathMsg IS STORED |
| FILTERSPEC | REGION WHERE RATE INFORMATION REQUESTED SAME AS THAT OF SENDER_TEMPLATE OF PATH MESSAGE PathMsg IS STORED |
| LABEL | REGION WHERE SAME LABEL INFORMATION AS THAT OF SENDER_TEMPLATE OF PATH MESSAGE PathMsg IS STORED |
| ALARM_SPEC | REGION WHERE TYPE OF OCCURRENCE OF ALARM AND OCCURRENCE TIME IS STORED |
| NOTIFY_REQUEST | USED WHEN Notify Msg IS REQUESTED |

TRANSMITTING APPARATUS AND TRANSMITTING METHOD

CROSS-REFERENCE TO RELATED APPLICATIONS

This application is based upon and claims the benefit of priority of the prior Japanese Patent Application No. 2008-143744, filed on May 30, 2008, the entire contents of which are incorporated herein by reference.

BACKGROUND

1. Field

The present invention relates to a transmitting apparatus and a transmitting method in which cross-connect information is used to transmit and receive a signaling message of a GMPLS function among plurality of nodes.

2. Description of the Related Art

Conventionally, a network manager managing a network performs cross-connect settings on all apparatuses (nodes) for path settings, such as a connection or branching from one arbitrary transmission path to another arbitrary transmission path. With this, an End-to-End path is established among the apparatuses forming the network.

In recent years, Multi-Protocol Label Switching (MPLS) has been used that allows an operation of a network with paths by introducing the concept of label switching into an Internet Protocol (IP) network. Also, Generalized Multi-Protocol Label Switching (GMPLS) has emerged, which is a technology of performing, in an autonomous distributing manner, an operation of a path networks, such as not only an IP network but also a Time Division Multiplexing (TDM) network and a Wavelength Division Multiplexing (WDM) network in Synchronous Digital Hierarchy (SDH)/Synchronous Optical NETwork (SONET), which is an international standard of a high-speed digital communication technique using an optical fiber (refer to Japanese Patent Application Laid-open Nos. 2005-20572 and 2006-287403). This GMPLS technology has been discussed for standardization in, for example Common Control and Measurement Plane (CCAMP)-Working Group (WG) Optical Internetworking Forum (OIF) of Internet Engineering Task Force (IETF) and International Telecommunication Union (ITU), and part of this technology is being put into practical use (refer to Request For Comment (RFC) 3471 and Request For Comment (RFC) 3473).

With reference to FIG. 16, End-to-End path establishment with GMPLS is explained, where the operation of a path network, such as a TDM network and a WDM network in SDH/SONET, is performed in an autonomous distributing manner. FIG. 16 is a diagram of a sequence of generating an End-to-End bidirectional path among apparatuses with GMPLS. As depicted in FIG. 16, transmitting apparatuses A to D are those such as TDM apparatuses or WDM apparatuses. When an End-to-End path is newly set among such transmitting apparatuses A to D by using a GMPLS function, a network manager specifies a start-point node (transmitting apparatus A) and an endpoint node (transmitting apparatus D). Then, the transmitting apparatuses A to D automatically perform route calculation, cross-connect settings, and other processes based on information about the specified start-point and endpoint to establish a path.

Specifically, when a start-point node and an endpoint node are specified by the network manager or the like at the transmitting apparatus A, the transmitting apparatus A, which is a start-point node, transmits to the transmitting apparatus B a path message (PathMsg: refer to FIGS. 17A and 18A) that specifies information about a route from the transmitting apparatuses A to D (Explicit_Route Object (ERO)), information about a band to be requested, and others (refer to (1) in FIG. 16).

Then, as with the transmitting apparatus A, the transmitting apparatus B, which is an intermediate node that receives the path message from the transmitting apparatus A, transmits to the transmitting apparatus C a path message with the route information, the band information, and others as being in a reserved state. Subsequently, the transmitting apparatus C, which is an intermediate node that receives the path message from the transmitting apparatus B, performs a process similar to that of the transmitting apparatus B to transmit a path message to the transmitting apparatus D.

Thereafter, the transmitting apparatus D, which is an endpoint node that receives the path message from the transmitting apparatus C, transmits to the transmitting apparatus C a reserve message (ResvMsg: refer to FIGS. 17B and 18B), which is a response message to the path message, and also performs path settings (cross-connect settings) on its own node (refer to (2) in FIG. 16).

Then, as with the transmitting apparatus D, the transmitting apparatus C, which is the intermediate node that receives the reserve message from the transmitting apparatus D, transmits a reserve message to the transmitting apparatus B and also performs path settings on its own node. Subsequently, the transmitting apparatus B which is the intermediate node that receives the reserve message from the transmitting apparatus C, performs a process similar to that of the transmitting apparatus C to transmit a reserve message to the transmitting apparatus A, and also performs path settings on its own node. Thereafter, the transmitting apparatus A, which is the start-point node that receives the reserve message from the transmitting apparatus B, performs path settings on its own node. As a result, bidirectional path settings from the transmitting apparatuses A to D are completed. FIGS. 17A and 17B depict a general signaling message for use in GMPLS. FIGS. 18A and 18B depict details of a general signaling message for use in GMPLS.

However, in the conventional technologies above, while the path is shifted to be under GMPLS management, the network service has to be once cut off and, consequently, a time occurs during which the network service cannot be provided.

Specifically, an existing path that has been present since the time before the GMPLS function is implemented cannot be managed as a path to be established with the GMPLS function. For this reason, to implement the GMPLS function in a network where the existing path has been established, all cross-connect settings that form the existing path have to be deleted, and then a path corresponding to the existing path has to be registered and set with the GMPLS function. As a result, while the path is being shifted to be under GMPLS management, the network service has to be once cut off and, consequently, a time occurs during which the network service cannot be provided.

SUMMARY

It is an object of the present invention to at least partially solve the problems in the conventional technology.

According to an aspect of an embodiment, a transmitting apparatus transmits and receives a signaling message of a GMPLS function among a plurality of nodes by using cross-connect information. The transmitting apparatus includes a first shift reserving unit that obtains specific cross-connect information at the time of a request for shifting to be under a GMPLS management and reserves input/output route information indicated by the obtained cross-connect information as a cross-connect to be shifted to be under the GMPLS management; and a first transmitting unit that specifies, from path information including the cross-connect information, a lower adjacent node serving as a transmission destination of the signaling message and being positioned lower than an own node, adds, to the signaling message, object information formed of cross-connect information on an output side of the own node in the signaling message and identification information uniquely identifying the own node, and then transmits the signaling message to the specified lower adjacent node.

According to another aspect of an embodiment, a transmitting apparatus transmits and receives a signaling message of a GMPLS function among a plurality of nodes by using cross-connect information. The transmitting apparatus includes a first shift reserving unit that obtains specific cross-connect information at the time of a request for shifting to be under a GMPLS management and reserves input/output route information indicated by the obtained cross-connect information as a bidirectional cross-connect to be shifted to be under the GMPLS management; and a second transmitting unit that specifies, from path information including the cross-connect information, a lower adjacent node serving as a transmission destination of the signaling message and being positioned lower than an own node, adds, to the signaling message, first object information formed of cross-connect information on an output side of the own node in the signaling message and identification information uniquely identifying the own node and second object information formed of cross-connect information on an input side of the own node in the signaling message and the identification information uniquely identifying the own node, and then transmits the signaling message to the specified lower adjacent node.

According to still another aspect of an embodiment, a method for transmitting and receiving a signaling message of a GMPLS function among a plurality of nodes by using cross-connect information, includes a first shift reserving step of obtaining specific cross-connect information at the time of a request for shifting to be under a GMPLS management, and reserving input/output route information indicated by the obtained cross-connect information as a cross-connect to be shifted to be under the GMPLS management; and a first transmitting step of specifying, from path information including the cross-connect information, a lower adjacent node serving as a transmission destination of the signaling message and being positioned lower than an own node, adding, to the signaling message, object information formed of cross-connect information on an output side of the own node in the signaling message and identification information uniquely identifying the own node, and then transmitting the signaling message to the specified lower adjacent node.

According to still another aspect of an embodiment, a method for transmitting and receiving a signaling message of a GMPLS function among a plurality of nodes by using cross-connect information, includes a first shift reserving step of obtaining specific cross-connect information at the time of a request for shifting to be under a GMPLS management, and reserving input/output route information indicated by the obtained cross-connect information as a bidirectional cross-connect to be shifted to be under the GMPLS management; and a second transmitting step of specifying, from path information including the cross-connect information, a lower adjacent node serving as a transmission destination of the signaling message and being positioned lower than an own node, adding, to the signaling message, first object information formed of cross-connect information on an output side of the own node in the signaling message and identification information uniquely identifying the own node and second object information formed of cross-connect information on an input side of the own node in the signaling message and the identification information uniquely identifying the own node, and then transmitting the signaling message to the specified lower adjacent node.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 3 depicts an example of an existing-path-information database according to the first embodiment;

FIG. 16 is a diagram of a sequence of generating an End-to-End bidirectional path among apparatuses with GMPLS;

FIGS. 18A and 18B depict details of a general signaling message for use in GMPLS.

DETAILED DESCRIPTION OF THE PREFERRED EMBODIMENTS

With reference to the attached diagrams, embodiments of a transmitting apparatus according to the present invention are explained in detail below. Note in the following that explanation is made first to general outlines and features of the transmitting apparatus according to the present invention, then to the configuration and process flow of the transmitting apparatus in sequence, and then finally to effects of the embodiments.

First Embodiment

General Outlines and Features

Figure 1:
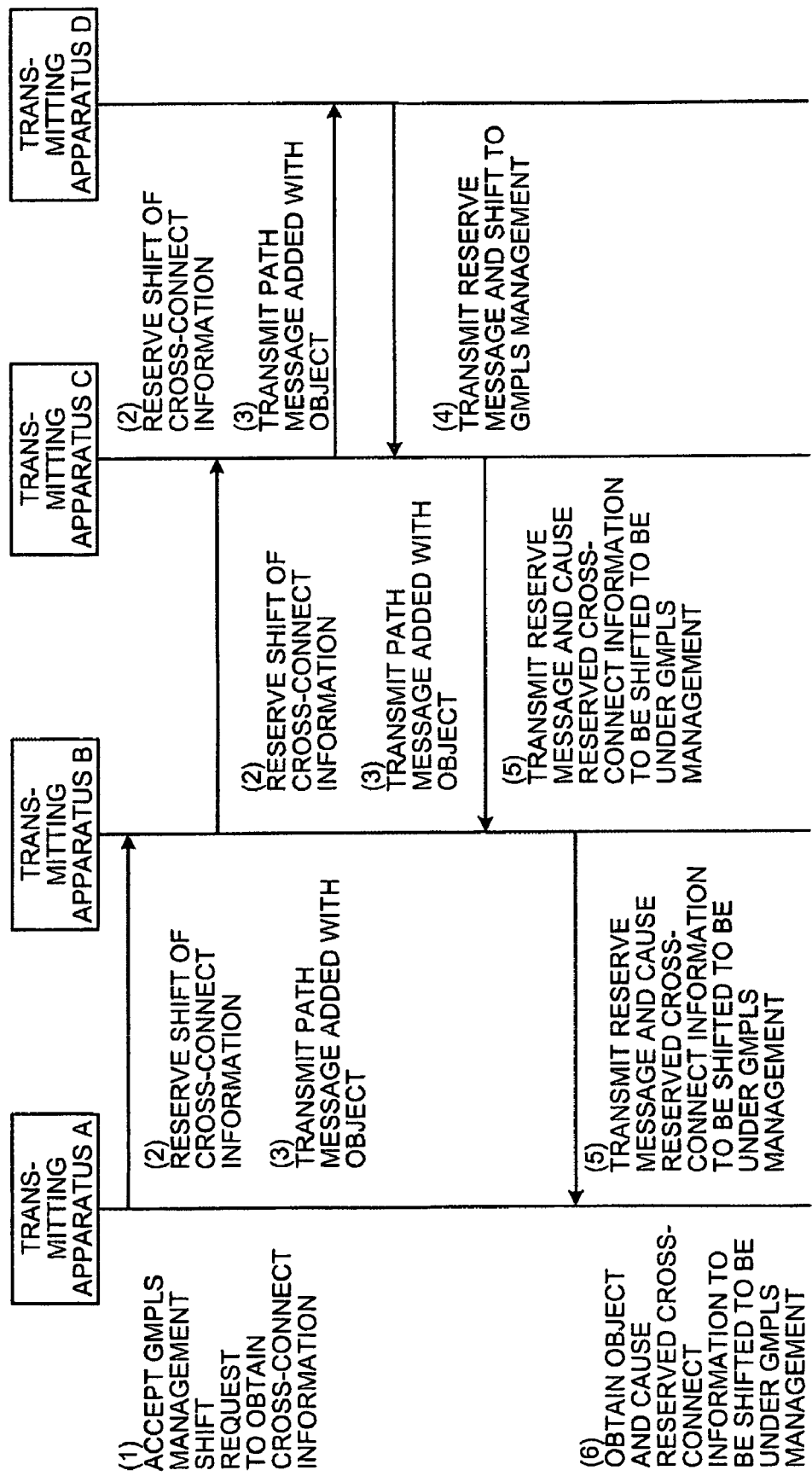
FIG. 1 is a diagram of general outlines and features of a transmitting apparatus according to a first embodiment.

First, by using FIG. 1, general outlines and features of a transmitting apparatus according to a first embodiment are explained. FIG. 1 is a diagram of general outlines and features of the transmitting apparatus according to the first embodiment.

A network including the transmitting apparatus disclosed in the present application has a transmitting apparatus A, a transmitting apparatus B, a transmitting apparatus C, and a transmitting apparatus D. In the present embodiment, an example is explained in which the transmitting apparatus A is taken as a start-point node, the transmitting apparatuses B and C are taken as intermediate nodes, and the transmitting apparatus D is taken as an endpoint node. Also, in each transmitting apparatus, information about paths that form the network is stored in a predetermined storage unit. Specifically, stored as path information are "own-node information" indicative of information about its own node, "link information" indicative of information about a node that faces the own node, and "cross-connect information" indicative of input/output route information of the own node.

Each transmitting apparatus explained in the present embodiment is a TDM apparatus, a WDM apparatus, or the like that has a GMPLS function incorporated therein and transmits and receives a signaling message, which is information exchanged for path establishment by using the GMPLS function. For example, the transmitting apparatus retains information about an adjacent node connected to a link of the own node and collected by a Link Management Protocol (LMP) function of GMPLS.

Also, by using the GMPLS function, an upper-node transmitting apparatus transmits a path message (PathMsg) to a lower-node transmitting apparatus as a signaling message, and a lower-node transmitting apparatus transmits a reserve message (ResvMsg) to an upper-node transmitting apparatus as a signaling message. For example, the transmitting apparatus A transmits a path message to a lower-node transmitting apparatus, and the transmitting apparatus D transmits a reserve message to an upper-node transmitting apparatus.

Note that the network to be explained in the present embodiment is not restricted to the one formed of four nodes, that is, the transmitting apparatuses A to D, but may be configured of five or more transmitting apparatuses. Also, in the network including transmitting apparatuses, although the transmitting apparatus A is taken as a start-point node in the following explanation, the network may be connected to a transmitting apparatus other than the transmitting apparatus B connected to the transmitting apparatus A, and thus the transmitting apparatus A can be an intermediate node or an endpoint node. Also in the following, explanation is made in the order of processes in the network, such that the transmitting apparatus A, which is a start-point node that transmits a path message comes first; next a process between the transmitting apparatuses B and C, which are intermediate nodes that transmit a path message; then a process of the transmitting apparatus D, which is an endpoint node that transmits a reserve message; then a process between the transmitting apparatuses C and B, which are intermediate nodes that receive the reserve message; and finally a process of the transmitting apparatus A, which is the start-point node that receives the reserve message.

The general outlines are as follows. In the configuration above, in a network with a plurality of nodes, the transmitting apparatus generally retains, in a predetermined storage unit, own-node information indicative of its own node, link information indicative of information about a node that faces the own node, and cross-connect information indicative of input/output route information of the own node set by a manager of the network, and uses the cross-connect information retained in the predetermined storage unit to transmit and receive a signaling message of the GMPLS function among the plurality of nodes. In particular, a main feature of the transmitting apparatus is to continuously provide a network service when an existing path is shifted to be under GMPLS management.

This main feature is now specifically explained. When accepting a GMPLS management shift request indicative of a request by a manager of the network for causing cross-connection information to shifted to be under GMPLS management, the transmitting apparatus obtains, from the predetermined storage unit, cross-connect information on an input side and on an output side of its own node to be under GMPLS management (refer to (1) in FIG. 1).

Specifically, for example, as a request by a manager of the network for causing existing cross-connection information to be shifted to be under GMPLS management, the transmitting apparatus A accepts own-node information and cross-connect information of the transmitting apparatus A as the start-point node and the transmitting apparatus D as the endpoint node. Then, the transmitting apparatus A accepting the GMPLS management shift request obtains, from the retained existing path information as a cross-connect information for GMPLS management shift in the transmitting apparatus A and cross-connect information on an input side of the accepting transmitting apparatus A, as a cross-connect information for GMPLS management shift in the transmitting apparatus A.

Then, the transmitting apparatus reserves the obtained cross-connect information as a cross-connect for GMPLS management shift (refer to (2) in FIG. 1). In the example above, specifically for instance, the transmitting apparatus A reserves the obtained cross-connect information on the input and output sides of the transmitting apparatus A as a cross-connect for GMPLS management shift in the transmitting apparatus A.

Subsequently, when the cross-connect for GMPLS management shift in the transmitting apparatus A is reserved, the transmitting apparatus specifies a lower adjacent node serving as a transmission destination of the signaling message from path information retained in a predetermined storage unit, and adds, to the signaling message, object information formed of the cross-connect information on the output side of the own node and identification information uniquely identifying the own node, and then transmits the signaling message to the specified lower adjacent node (refer to (3) in FIG. 1).

In the example above, specifically for instance, when the cross-connect for GMPLS management shift is reserved, the transmitting apparatus A searches path information for link information in the own node that matches the cross-connect information on the output side to specify the transmitting apparatus B as a lower adjacent node serving as a transmission destination of the path message. Then, the transmitting apparatus A adds, to a path message, object information formed of the cross-connect information on the output side of the transmitting apparatus A and identification information uniquely identifying the transmitting apparatus A (for example, Node ID retained in the transmitting apparatus A), and transmits the path message to the transmitting apparatus B, which is the specified lower adjacent node.

Figure 17A:
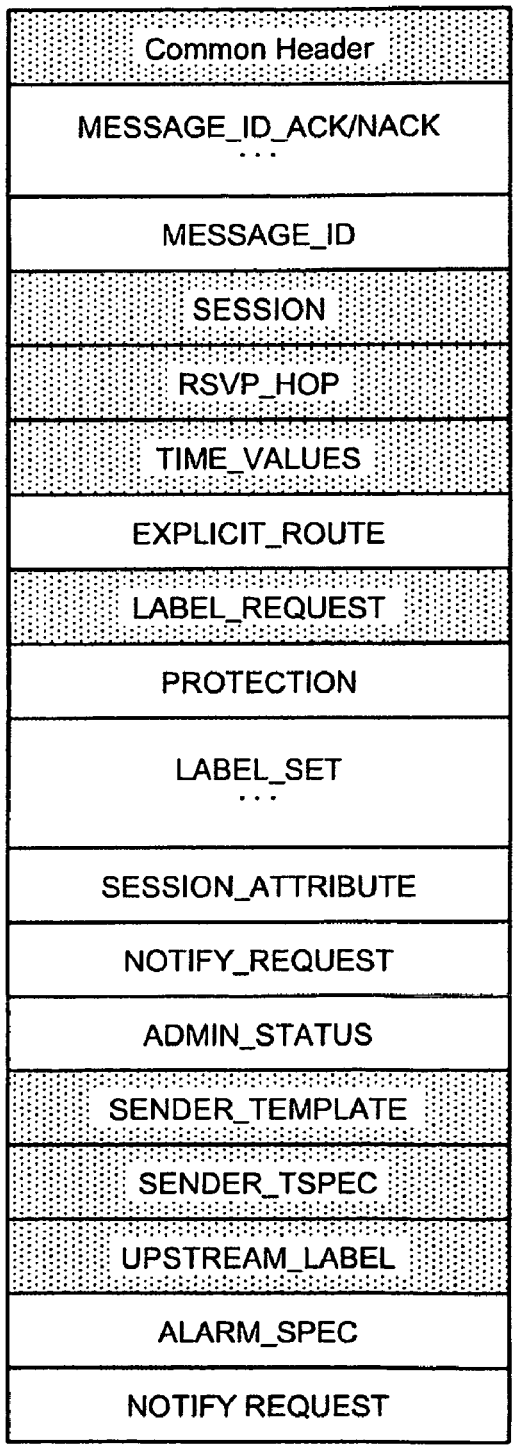
FIGS. 17A and 17B depict a general signaling message for use in GMPLS.
Figure 17B:
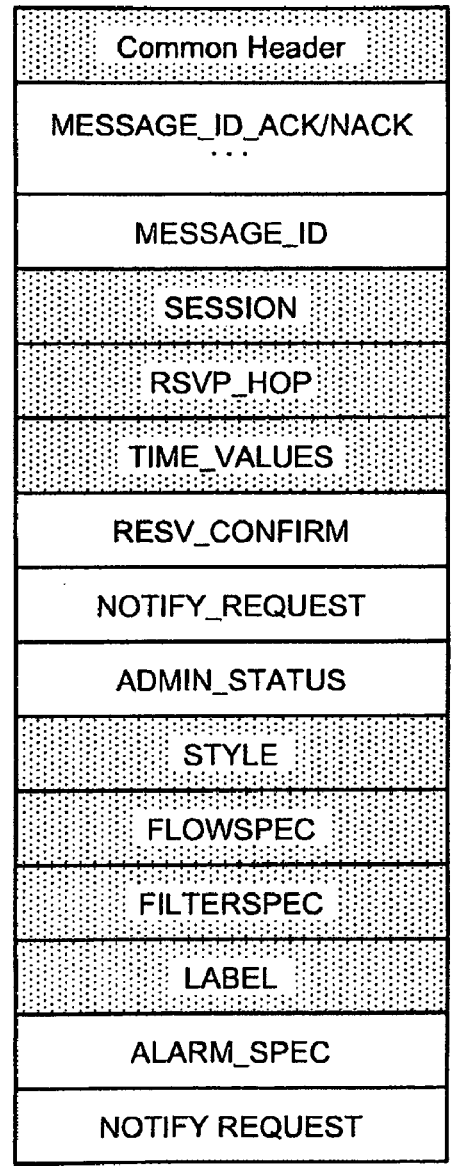

Now the process of the transmitting apparatus B, which is an intermediate node that transmits a path message, is explained. The transmitting apparatus B accepting a path message from the transmitting apparatus A, which is the start-point node, compares identification information of the endpoint node specified in an EXPLICIT_ROUTE object (refer to FIGS. 17A and 18A) of the path message received from the transmitting apparatus A and identification information of the own node (transmitting apparatus B) to determine that the own node (transmitting apparatus B) is an intermediate node. The transmitting apparatus B then obtains, from the existing-path information retained in the transmitting apparatus B, cross-connect information on input and output sides of the transmitting apparatus B. Subsequently, the transmitting apparatus B reserves the obtained cross-connect information on the input and output sides of the transmitting apparatus B as a cross-connect for GMPLS management shift in the transmitting apparatus B. Thereafter, when the cross-connect for GMPLS management shift is reserved, the transmitting apparatus B searches link information in the own node that matches the cross-connect information on the output side from the existing-path information to specify a lower adjacent node (transmitting apparatus C) serving as a lower adjacent node serving as a transmission destination of the path message. Then, the transmitting apparatus B adds, to a path message, object information formed of the cross-connect information on the output side of the transmitting apparatus B and identification information uniquely identifying the transmitting apparatus B, and transmits the path message to the transmitting apparatus C, which is the specified lower adjacent node.

Now the process of the transmitting apparatus C, which is an intermediate node that transmits a path message, is explained. The transmitting apparatus C performs a process similar to that of the transmitting apparatus B to obtain cross-connect information on input and output sides of the transmitting apparatus C and reserve the cross-connect information as a cross-connect for GMPLS management shift in the transmitting apparatus C; adds, to a path message, object information formed of the cross-connect information on the output side of the transmitting apparatus C and identification information uniquely identifying the transmitting apparatus C; and then transmits the path message to the transmitting apparatus D, which is the lower adjacent node.

Thereafter, when it is determined based on the transmitted and received signaling message that the own node is the endpoint node, the transmitting apparatus transmits a signaling message added with the object information to the upper adjacent node. Also, the transmitting apparatus obtains the cross-connect information of the own node from the cross-connect information retained in the predetermined storage unit, and causes the obtained cross-connect information to be shifted under GMPLS management (refer to (4) in FIG. 1).

In the example above, specifically for instance, the transmitting apparatus D compares identification information of the endpoint node specified in an EXPLICIT_ROUTE object of the received path message transmitted from the transmitting apparatus C, which is an upper adjacent node and identification information of the own node to determine that the own node (transmitting apparatus D) is the endpoint node.

Then, the transmitting apparatus D transmits to the transmitting apparatus C, which is an upper adjacent node, the signaling message added with object information formed of cross-connect information on an output side of each upper node and identification information uniquely identifying each upper node, as a reserve message. Subsequently, the transmitting apparatus D obtains cross-connect information on input and output sides of the transmitting apparatus D, updates the cross-connect information as a cross-connect for GMPLS management shift in the transmitting apparatus D, and causes the path management under the existing path management to be shifted to be under GMPLS path management.

Then, when it is determined based on the transmitted and received signaling message that the own node is an intermediate node, the transmitting apparatus transmits to an upper adjacent node a signaling message added with the object information, and also causes the reserved cross-connect for GMPLS management shift under the existing path management to be shifted to be under GMPLS management (refer to (5) in FIG. 1)

In the example above, specifically for instance, based on object information formed of the cross-connect information on the out put side of each node for the received reserve message transmitted from the transmitting apparatus D, which is a lower adjacent node, and identification information uniquely identifying each node, the transmitting apparatus C determines that the own node (transmitting apparatus C) is an intermediate node. Then, the transmitting apparatus C transmits to the transmitting apparatus B, which an upper adjacent node, a signaling message added with object information of each node as a reserve message. Subsequently, the transmitting apparatus C updates the cross-connect for GMPLS management shift reserved at the time of receiving the path message to cause the path management under the existing path management to be shifted to be under GMPLS path management.

Now the process of the transmitting apparatus B, which is an intermediate node that receives a reserve message, is explained. When performing a process similar to that of the transmitting apparatus C to receive a reserve message from the transmitting apparatus C, the transmitting apparatus B transmits to the transmitting apparatus A a signaling message added with object information formed of cross-connect information on an output side of each node and identification information uniquely identifying each node as a reserve message. Then, the transmitting apparatus B updates the cross-connect for GMPLS management shift reserved at the time of receiving the path message to cause the path management under the existing path management to be shifted to be under GMPLS path management.

Subsequently, when it is determined based on the transmitted and received signaling message that the own node is the start-point node, the transmitting apparatus obtains object information from the accepted signaling message, and causes the reserved cross-connect for GMPLS management shift to be shifted to be under GMPLS management (refer to (6) in FIG. 1).

In the example above, specifically for instance, based on an object formed of cross-connect information of the reserve message transmitted to and received by the transmitting apparatus B, which is a lower adjacent node, on the output side of each node and identification information uniquely identifying each node, the transmitting apparatus A determines that the own node (transmitting apparatus A) is the start-point node. Then, the transmitting apparatus A obtains the object information from the reserve message. Subsequently, the transmitting apparatus A updates the cross-connect for GMPLS management shift reserved at the time of transmitting the path message to cause the path management under the existing path management to be shifted to be under GMPLS path management.

As explained above, when the path management of the network where a path set by the network manager is present is shifted to be under GMPLS path management, the transmitting apparatus according to the first embodiment transmits a path message added with an object for path shift. Also, the transmitting apparatus reserves a cross-connect for GMPLS management shift and transmits a reserve message. Furthermore, the transmitting apparatus updates the reserved cross-connect for GMPLS management shift to shift the path management. As a result, as the main feature explained above, when the existing path is shifted to be under GMPLS management, a network service can be continuously provided.

Figure 2:
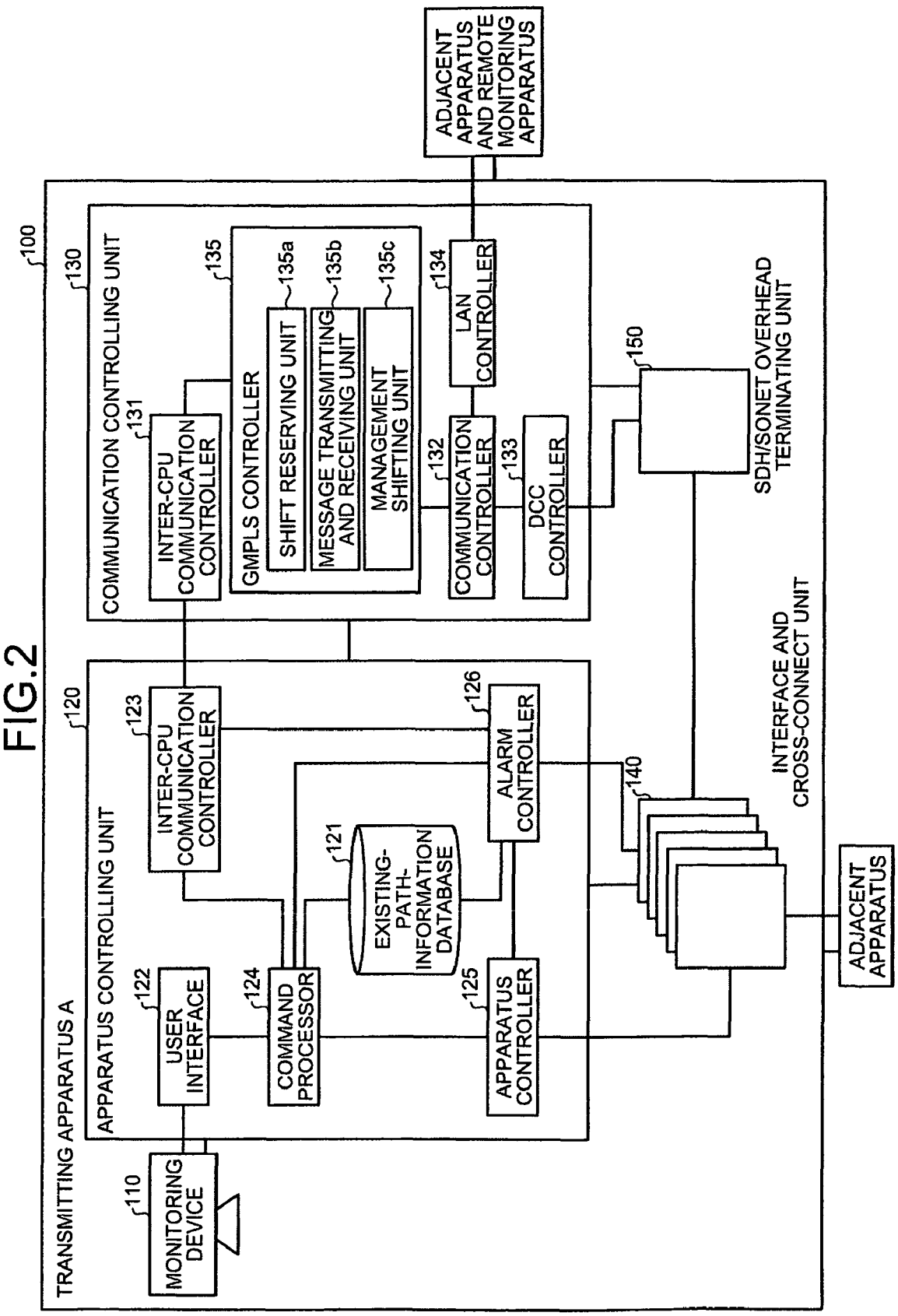
FIG. 2 is a diagram of the configuration of the transmitting apparatus according to the first embodiment.

That is, when the reserved cross-connect for GMPLS management shift is updated, the transmitting apparatus updates the management state without deleting or regenerating the cross-connect at all. Therefore, compared with a case in the conventional technology in which all existing paths are deleted and then a cross-connect is newly generated, the existing path that has been present since the time before implementation of the GMPLS function can be shifted to be under GMPLS management without cutting off the network service. Therefore an adverse effect on users using the network service can be eliminated. Configuration of the transmitting apparatus according to the first embodiment Next, by using FIG. 2, the configuration of the transmitting apparatus according to the first embodiment is explained. FIG. 2 is a diagram of the configuration of the transmitting apparatus according to the first embodiment. Note that the process by a plurality of transmitting apparatuses in a network will be explained in detail further below with reference to FIGS. 4 to 12. In the following, general outlines of the process by the transmitting apparatus are explained.

As depicted in FIG. 2, a transmitting apparatus A 100 includes a monitoring device 110, an apparatus controlling unit 120, a communication controlling unit 130, an interface and cross-connect unit 140, and an overhead terminating unit 150. Also, the transmitting apparatus A 100 is interconnected with an adjacent transmitting apparatus having functions equivalent to those of the transmitting apparatus A 100, a remote monitoring apparatus that manages an adjacent optically-connected (fiber-connected) transmitting apparatus and a network in a unified manner, and other apparatuses. Note that it is assumed that, in a network including the transmitting apparatus A 100, a path is set in advance by a network manager.

The monitoring device 110 controls a command input to the transmitting apparatus A 100. Specifically, the monitoring device 110 is used when updating of a database and path settings among transmitting apparatuses are performed by the network manager. For example, to set a path between nodes in the network including the transmitting apparatus A 100 is set by GMPLS, the monitoring device 110 receives information, such as Node identifications (IDs) of the start-point node and the endpoint node, a Link ID, and channel (Ch) information.

The apparatus controlling unit 120 includes an existing-path-information database 121, a user interface 122, an inter-CPU communication controller 123, a command processor 124, an apparatus controller 125, and an alarm controller 126 to process an optical main signal.

The existing-path-information database 121 stores existing path information set in advance by the network manager. For example, as depicted in FIG. 3, the existing-path-information database 121 stores own-node information "own-node ID: 1.1.1.1" and "own-node IP addres: 10.5.20.11". Also, for example, the existing-path-information database 121 stores "own-node-side link ID: 5", "facing-node ID: 3.3.3.3", "facing-node IP addres: 10.5.20.13", and "facing-node link ID: 2". Furthermore, for example, the existing-path-information database 121 stores cross-connect information "from-side link ID: 3", "from-side Ch information: 49", "to-side link ID: 5", "to-side Ch information: 1", and "bandwidth: STS1". FIG. 3 depicts an example of the existing-path-information database 121 according to the first embodiment.

The user interface 122 controls communications between the monitoring device 110 and the apparatus controlling unit 120 regarding various information obtained via the network. For example, the user interface 122 notifies the command processor 124, which will be explained further below, of a command accepted by the monitoring device 110, and notifies the monitoring device 110 of an alarm controlled by the alarm controller 126, which will also be explained further below.

The inter-CPU communication controller 123 controls communications between the apparatus controlling unit 120 and the communication controlling unit 130 regarding various information obtained via the network. For example, the inter-CPU communication controller 123 notifies the communication controlling unit 130 of information about the updated existing-path-information database 121.

When a GMPLS management shift request is accepted indicative of a request by the network manager for causing cross-connect information to be shifted to be under GMPLS management, the command processor 124 obtains, from a predetermined storage unit, cross-connect information on input and output sides of the own node to be under GMPLS management.

Specifically, for example, the command processor 124 accepts node IDs, link IDs, and Ch information of the start-point node and the endpoint node input through the monitoring device 110 as a request by the network manager or the like for causing the existing cross-connect information to be shifted to be under GMPLS management. Then, the command processor 124 accepting the GMPLS management shift request obtains, from the existing-path-information database 121 retained in the own node, the link ID and Ch information of the cross-connect information on the input and output sides of the own node as cross-connect information for GMPLS management shift at the own node Also, in general, the command processor 124 performs control according to a command accepted by the monitoring device 110, and notifies the monitoring device 110 of a signal accepted within the apparatus controlling unit 120 or from another unit. For example, the command processor 124 updates the existing-path-information database 121 according to a registration in the existing-path-information database 121 accepted by the monitoring device 110. Also, for example, upon accepting an alarm from the alarm controller 126, which will be explained further below, the command processor 124 notifies the monitoring device 110 via the user interface 122.

The apparatus controller 125 controls a signal connection with another apparatus via the interface and cross-connect unit 140. For example, the apparatus controller 125 controls a signal connection via the interface and cross-connect unit 140 for path settings with an adjacent transmitting apparatus having functions equivalent to those of the transmitting apparatus A 100 via optical coupling.

The alarm controller 126 notifies the monitoring device 110 of a failure when it occurs. For example, the alarm controller 126 monitors a path of the network connected to another apparatus, the transmitting apparatus A 100, and others and, when a path failure or the like occurs, notifies the monitoring device 110 via the command processor 124 and the user interface 122 of path-failure information about the occurring path failure (for example, loss of signal (LOS)) by referring to the existing-path-information database 121 to see the location of the occurring path failure.

The communication controlling unit 130 includes an inter-CPU communication controller 131, a communication controller 132, a Data-Communication-Channel (DCC) controller 133, a Local-Area Network (LAN) controller 134, and a GMPLS controller 135, mainly controlling a path message and a reserve message, which are signaling messages to be transmitted and received over the network The inter-CPU communication controller 131 controls communications between the communication controlling unit 130 and the apparatus controlling unit 120 regarding various information obtained via the network. For example, the inter-CPU communication controller 131 receives information about the existing-path-information database 121 transmitted by the apparatus controlling unit 120.

The communication controller 132 is connected to the DCC controller 133. The DCC controller 133 terminates an overhead, and is connected between the overhead terminating unit 150 connected to the interface and cross-connect unit 140 and the communication controller 132 to control a data communication channel (DCC). The LAN controller 134 controls communications over a Local-Area Network (LAN). Note that transmission and reception of a packet for GMPLS control by the GMPLS controller 135, which will be explained further below, are performed either one of a data communication channel and LAN.

The GMPLS controller 135 controls a path message and a reserve message exchanged between the transmitting apparatus A 100 forming the network and a transmitting apparatus having functions equivalent to those of the transmitting apparatus A 100. As components particularly related to the present invention, the GMPLS controller 135 includes a shift reserving unit 135*a*, a message transmitting and receiving unit 135*b*, and a management shifting unit 135*c*.

The shift reserving unit 135*a* reserves cross-connect information obtained by the command processor 124 as a cross-connect for GMPLS management shift. In the example above, specifically for instance, the shift reserving unit 135*a* reserves link IDs and Ch information on input and output sides of the transmitting apparatus A 100 obtained by the command processor 124 as a cross-connect for GMPLS management shift.

When a cross-connect for GMPLS management shift is reserved by the shift reserving unit 135*a*, the message transmitting and receiving unit 135*b* specifies a lower adjacent node, which is a transmitting destination of a signaling message, from link information retained in the existing-path-information database 121, adds, to the signaling message, object information formed of cross-connect information on the output side of the own node and identification information uniquely identifying the own node, and then transmits the signaling message to the specified lower adjacent node.

In the example above, specifically for instance, when a cross-connect for GMPLS management shift is reserved by the shift reserving unit 135, the message transmitting and receiving unit 135*b* searches the existing-path-information database 121 for link information in the transmitting apparatus A 100 that matches the link ID, which is cross-connect information on the output side, to specify a lower adjacent node serving as a transmitting destination of the path message. Then, the message transmitting and receiving unit 135*b* adds, to a path message, object information formed of a link ID and Ch information, which are cross-connect information on the output side of the transmitting apparatus A 100, and a node ID, which is identification information uniquely identifying the transmitting apparatus A 100, and then transmits the path message to the specified lower adjacent node.

When it is determined based on the received signaling message transmitted from the message transmitting and receiving unit 135*b* that the own node is the endpoint node, the management shifting unit 135*c* transmits a signaling message added with the object information to an upper adjacent node. Also, the management shifting unit 135*c* obtains cross-connect information of the own node from the cross-connect information retained in the existing-path-information database 121 to cause the obtained cross-connect information to be shifted to be under GMPLS management.

Specifically, in the example above, the management shifting unit 135*c* compares the node ID of the endpoint node specified in an EXPLICIT_ROUTE object of the received path message transmitted from the message transmitting and receiving unit 135*b* and the node ID of the transmitting apparatus A 100 to determine that the transmitting apparatus A 100 is the endpoint node.

Then, the management shifting unit 135*c* transmits, to an upper adjacent node, a signaling message added with object information formed of the link ID and Ch information on the output side of each upper node and a node ID uniquely identifying each upper node as a reserve message. Subsequently, the management shifting unit 135*c* obtains link IDs and Ch information on input and output sides of the transmitting apparatus A 100 to update as a cross-connect for GMPLS management shift in the transmitting apparatus A 100, and causes the path management under the existing path management to be shifted to be under GMPLS path management.

Furthermore, when it is determined based on the received signaling message that the own node is the intermediate node, the management shifting unit 135*c* transmits a signaling message added with object information to the upper adjacent node, and causes the cross-connect for GMPLS management shift reserved by the shift reserving unit 135*a* to be shifted to be under GMPLS management.

Specifically, in the example above, based on object information formed of the link ID and Ch information on the output side of each node of the received reserve message and a node ID uniquely identifying each node, the management shifting unit 135*c* determines that the transmitting apparatus A 100 is an intermediate node.

Then, the management shifting unit 135*c* transmits a reserve message added with the object information to an upper adjacent node. Subsequently, the management shifting unit 135*c* updates the cross-connect for GMPLS management shift reserved by the shift reserving unit 135*a* at the time of receiving the path message to cause the path management under the existing path management to be shifted to be under GMPLS path management.

Furthermore, based on the received signaling message, when it is determined that the own node is the start-point node, the management shifting unit 135*c* obtains object information from the accepted signaling message, and causes the cross-connect for GMPLS management shift reserved by the shift reserving unit 135*a* to be shifted to be under GMPLS management.

Specifically, in the example above, based on object information formed of the link ID and Ch information on the output side of each node of the received reserve message and a node ID uniquely identifying each node, the management shifting unit 135c determines that the transmitting apparatus A 100 is the start-point node.

Figure 4:
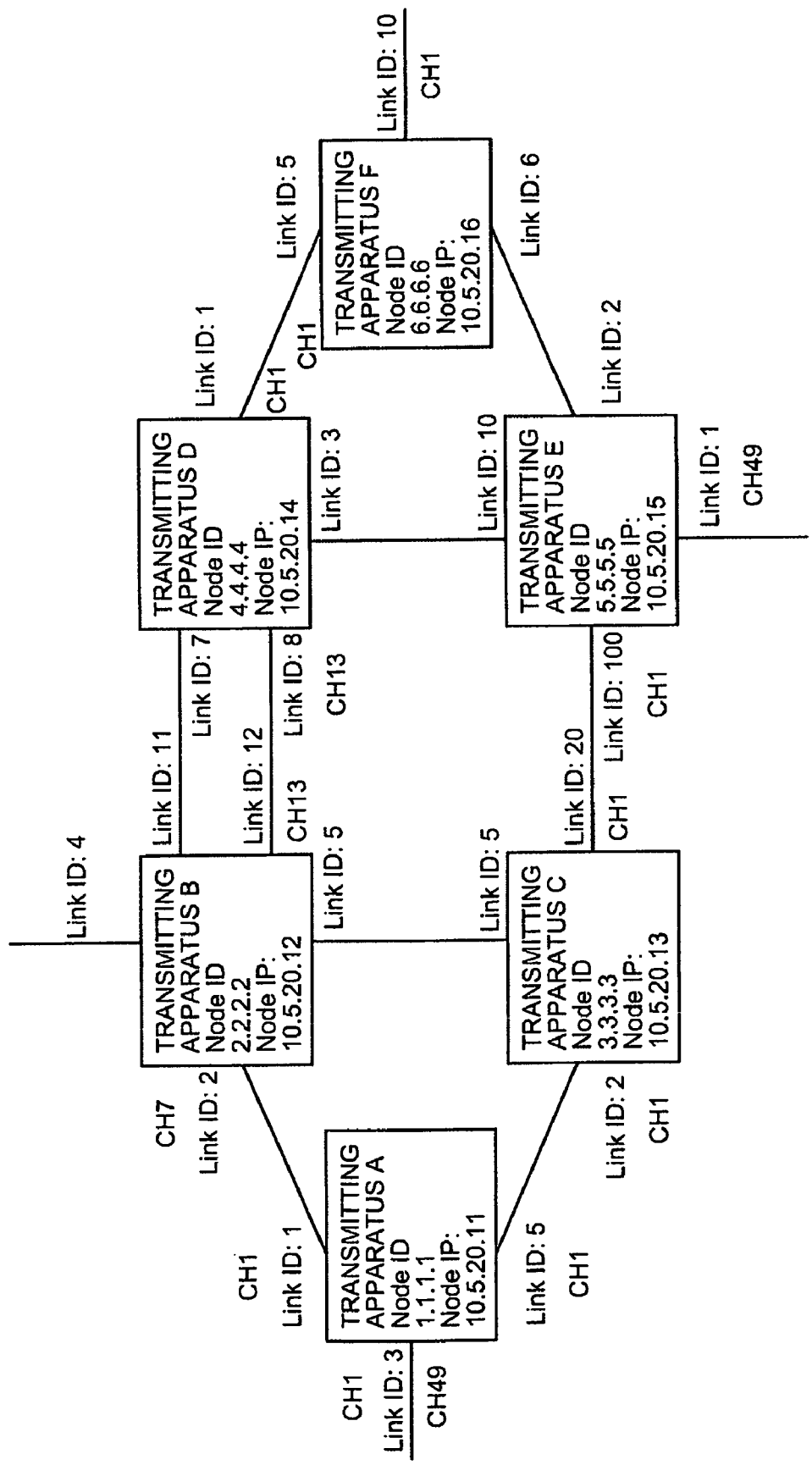
FIG. 4 is a diagram of a network configuration according to the first embodiment.

Then, the management shifting unit 135c obtains the object information from the reserve message. Subsequently, the management shifting unit 135c updates the cross-connect for GMPLS management shift reserved by the shift reserving unit 135a at the time of transmitting the path message to cause the path management under the existing path management to be shifted to be under GMPLS path management. GMPLS management shifting process according to the first embodiment Next, by using FIGS. 4 to 12, a GMPLS management shifting process according to the first embodiment is explained. FIG. 4 is a diagram of a network configuration according to the first embodiment.

Figure 5:
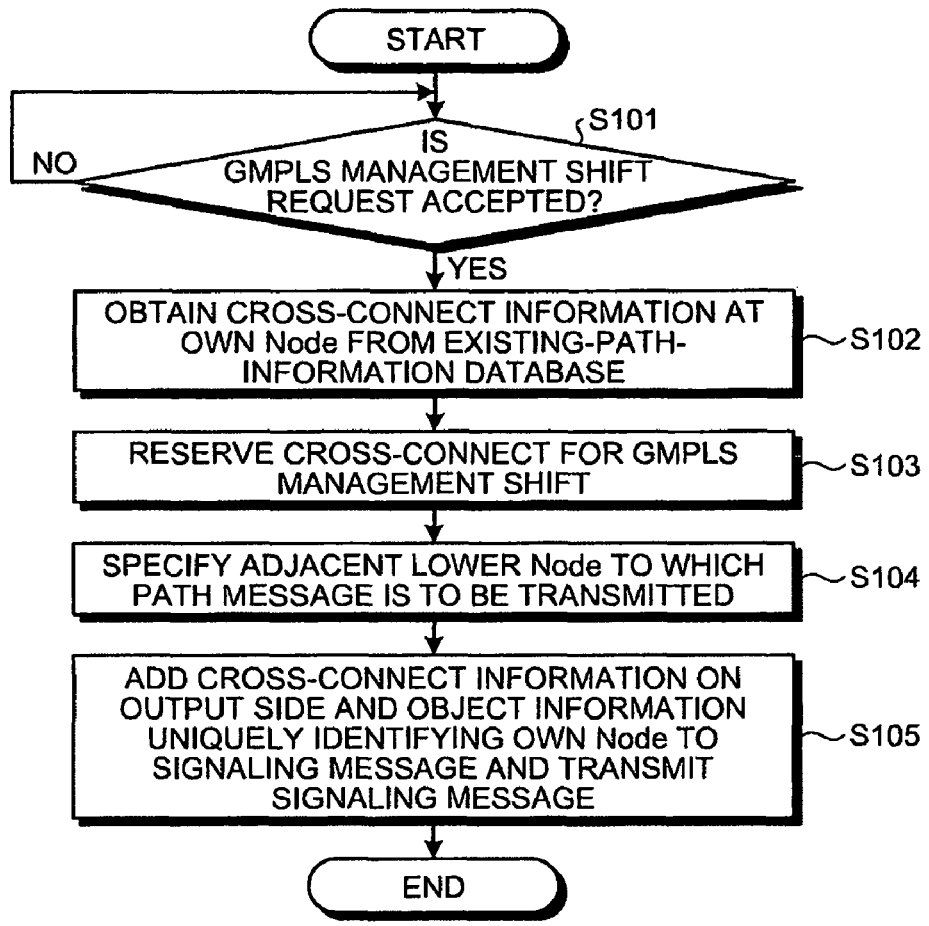
FIG. 5 is a flowchart of a GMPLS management shifting process of a transmitting apparatus A at the time of transmitting a path message according to the first embodiment.

The network of FIG. 4 includes the transmitting apparatus A, the transmitting apparatus B, the transmitting apparatus C, the transmitting apparatus D, a transmitting apparatus E and a transmitting apparatus F. In the present embodiment, explanation is made with the transmitting apparatus A being taken as a start-point node, the transmitting apparatus C being taken as an intermediate node, and the transmitting apparatus E being taken as an endpoint node. Also, each transmitting apparatus path has information forming the network stored in a predetermined storage unit, and transmits and receives a path message, a reserve message, and the like by using the GMPLS function. Note that, in FIGS. 5 to 12, a GMPLS management shifting process in a network having the transmitting apparatuses A, C, and E is explained by using the network configuration in FIG. 4. (GMPLS management shifting process of the start-point node at the time of transmitting a path message) FIG. 5 is a flowchart of a GMPLS management shifting process of the transmitting apparatus A at the time of transmitting a path message according to the first embodiment. As depicted in FIG. 5, when accepting a GMPLS management shift request indicative of a request by the network manager for causing the cross-connect information to be shifted to be under GMPLS management ("Yes" at step S101), the transmitting apparatus A obtains cross-connect information on input and output sides of the own node for GMPLS management from a predetermined storage unit (step S102).

Specifically, for example, as a GMPLS management shift request indicative of a request by network manager for causing the cross-connect information to be shifted to be under GMPLS management, the transmitting apparatus A accepts the node ID "1.1.1.1" of the transmitting apparatus A as the start-point node, an input-side link ID "3", input-side Ch information "49", the node ID "5.5.5.5" of the transmitting apparatus E as the endpoint node, an output-side link ID "1", and output-side Ch information "49".

Then, the transmitting apparatus A accepting the GMPLS management shift request obtains, from the existing-path-information database 121 (refer to FIG. 3) retained in the accepting transmitting apparatus A, the link ID "3" and the Ch information "49" of the cross-connect information on the input side of the accepting transmitting apparatus A and the link ID "5" and the Ch information "1" of the cross-connect information on the output side of the transmitting apparatus A.

Then, the transmitting apparatus A reserves the obtained cross-connect information as a cross-connect for GMPLS management shift (step S103). In the example above, specifically, the transmitting apparatus A reserves the obtained link ID "3" and Ch information "49" of the cross-connect information on the input side of the transmitting apparatus A and the obtained link ID "5" and Ch information "1" of the cross-connect information on the output side of the transmitting apparatus A as a cross-connect for GMPLS management shift of the transmitting apparatus A.

Subsequently, when the cross-connect for GMPLS management shift is reserved, the transmitting apparatus A specifies a lower adjacent node serving as a transmission destination of the signaling message from link information retained in a predetermined storage unit (step S104), adds, to the signaling message, object information formed of the cross-connect information on the output side of the own node and identification information uniquely identifying the own node, and then transmits the signaling message to the specified lower adjacent node (step S105).

In the example above, specifically for instance, when the cross-connect for GMPLS management shift is reserved, the transmitting apparatus A searches the existing-path-information database 121 for link information (node-A link ID "5", facing-node ID "3.3.3.3", node IP "10.5.20.13", and link ID "2") in the transmitting apparatus A that matches the link ID "5", which is cross-connect information on the output side to specify the transmitting apparatus C, which is a lower adjacent node serving as a transmission destination of the path message.

Figure 6:
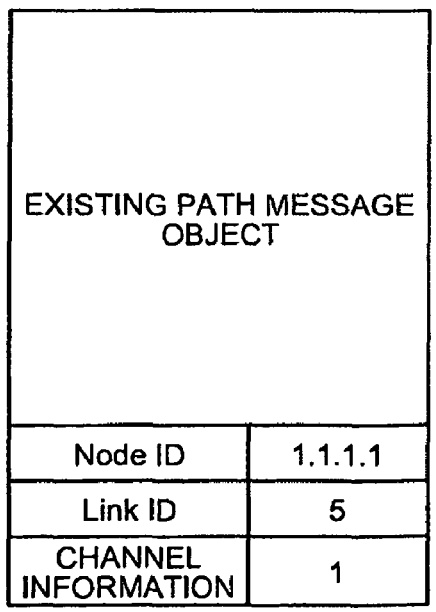
FIG. 6 depicts an example of object information to be added by the transmitting apparatus A according to the first embodiment to the path message.

Then, the transmitting apparatus A adds, to a path message, object information formed of the link ID "5" and the Ch information "1" of the cross-connect information on the output side of the transmitting apparatus A and node ID "1.1.1.1" uniquely identifying the transmitting apparatus A (refer to FIG. 6), and then transmits the path message to the transmitting apparatus C, which is the specified lower adjacent node. FIG. 6 depicts an example of the object information to be added by the transmitting apparatus A according to the first embodiment to the path message. (GMPLS management shifting process of the intermediate node at the time of transmitting a path message)

Figure 7:
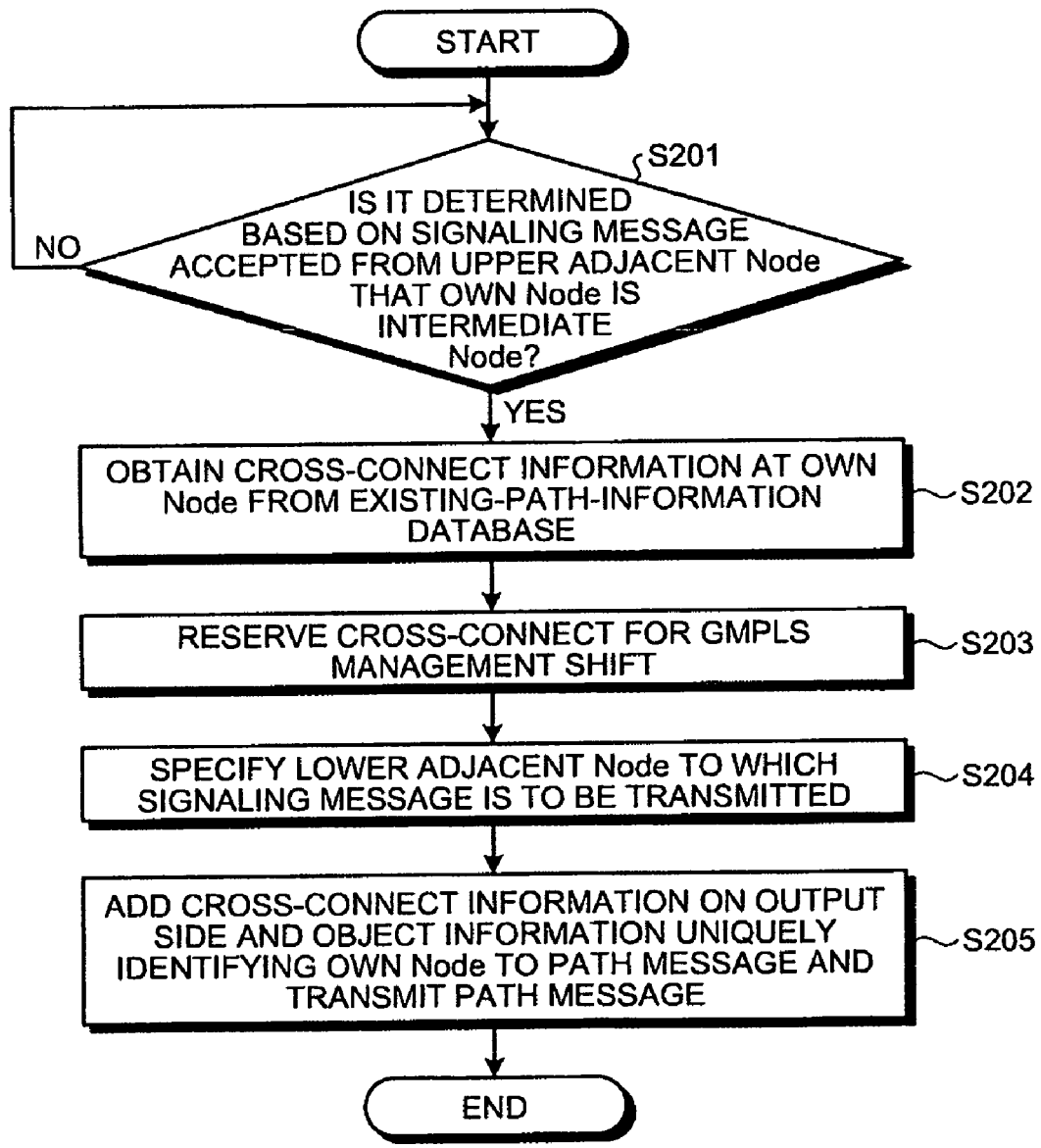
FIG. 7 is a flowchart of a GMPLS management shifting process of a transmitting apparatus C at the time of transmitting a path message according to the first embodiment.

Next, by using FIG. 7, a GMPLS management shifting process of the intermediate node at the time of transmitting a path message according to the first embodiment is explained. FIG. 7 is a flowchart of a GMPLS management shifting process of the transmitting apparatus C at the time of transmitting a path message according to the first embodiment.

As depicted in FIG. 7, when it is determined based on the signaling message accepted from the upper adjacent node that the own node is an intermediate node ("Yes" at step S201), the transmitting apparatus C obtains cross-connect information on input and output side of the own node for GMPLS management from a predetermined storage unit (step S202).

In the example above, specifically for instance, the transmitting apparatus C compares the node ID "5.5.5.5" of the endpoint node specified in an EXPLICIT_ROUTE object of the path message received from the transmitting apparatus A and the node ID "3.3.3.3" of the transmitting apparatus C to determine that the own node (transmitting apparatus C) is an intermediate node.

Then, the transmitting apparatus C obtains, from the existing-path-information database 121 retained in the transmitting apparatus C, the link ID "2" and the Ch information "1" of the cross-connect information on the input side of the transmitting apparatus C and the link ID "20" and the Ch information "1" of the cross connect information on the output side of the transmitting apparatus C.

Then, the transmitting apparatus C reserves the obtained cross-connect information as a cross-connect for GMPLS management shift (step S203). In the example above, specifically for instance, the transmitting apparatus C reserves the obtained link ID "2" and the Ch information "1" of the cross-connect information on the input side of the transmitting apparatus C and the obtained link ID "20" and the Ch information "1" of the cross connect information on the output side of the transmitting apparatus C as a cross-connect for GMPLS management shift in the transmitting apparatus C.

Subsequently, when the cross-connect for GMPLS management shift is reserved, the transmitting apparatus C specifies a lower adjacent node serving as a transmission destination of a signaling message from the link information retained in a predetermined storage unit (step S204), adds, to the signaling message, object information formed of the cross-connect information on the output side of the own node and identification information uniquely identifying the own node, and then transmits the signaling message to the specified lower adjacent node (step S205).

In the example above, specifically for instance, when the cross-connect for GMPLS management shift is reserved, the transmitting apparatus C searches the existing-path-information database 121 for a link (node-C link ID "20", facing-node ID "5.5.5.5", node IP "10.5.20.15", and link ID "100") in the transmitting apparatus C that matches the link ID "20" of the cross-connect information on the output side to specify the transmitting apparatus E, which is a lower adjacent node serving as a transmission destination of a path message.

Figure 8:
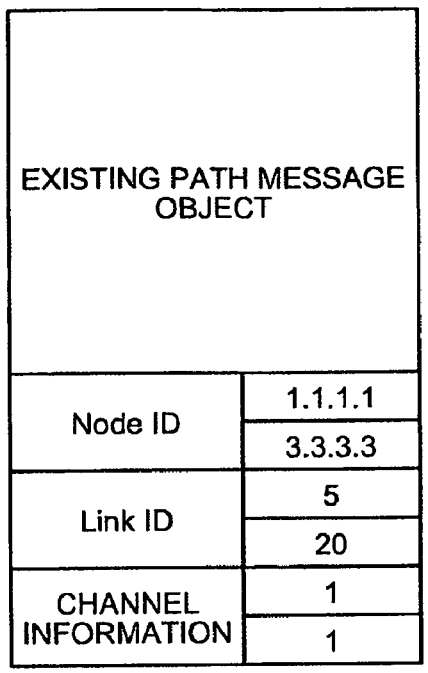
FIG. 8 depicts an example of object information to be added by the transmitting apparatus C according to the first embodiment to the path message.

Then, the transmitting apparatus C adds, to a path message, object information formed of the link ID "20" and the Ch information "1" of the cross connect information on the output side of the transmitting apparatus C and the node ID "3.3.3.3" uniquely identifying the transmitting apparatus C (refer to FIG. 8), and then transmits the path message to the transmitting apparatus E, which is the specified lower adjacent node. FIG. 8 depicts an example of object information to be added by the transmitting apparatus C according to the first embodiment to the path message.

(GMPLS Management Shifting Process of the Endpoint Node at the Time of Receiving a Path Message)

Figure 9:
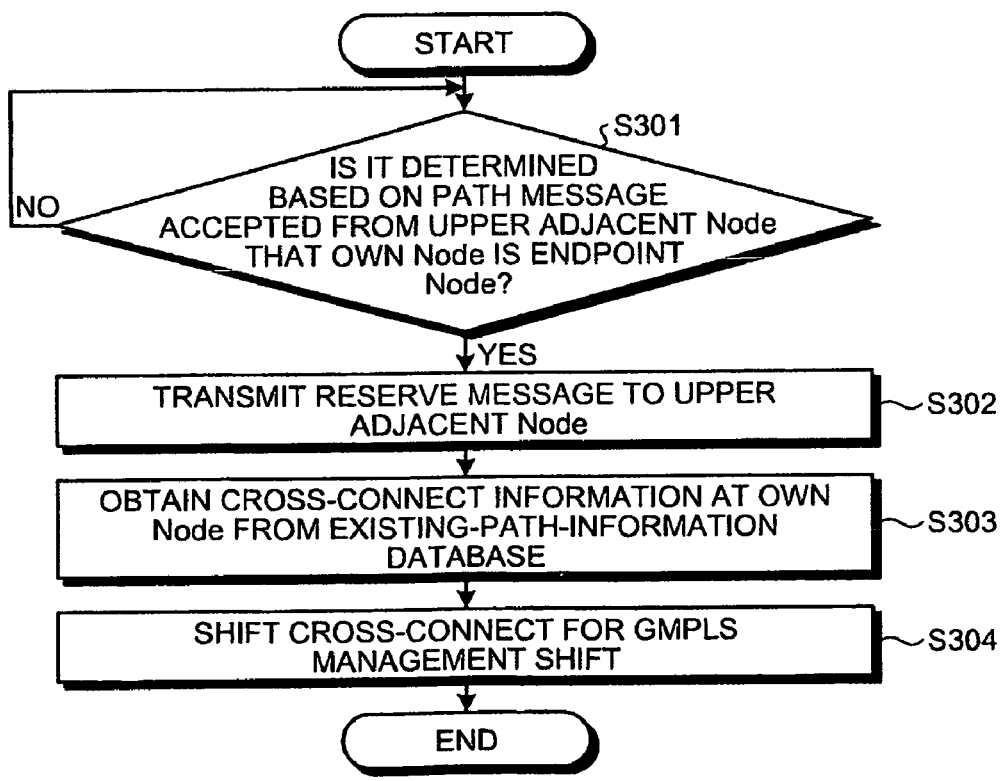
FIG. 9 is a flowchart of a GMPLS management shifting process of a transmitting apparatus E at the time of transmitting a path message according to the first embodiment.

Next, by using FIG. 9, a GMPLS management shifting process of the endpoint node at the time of receiving a path message according to the first embodiment is explained. FIG. 9 is a flowchart of a GMPLS management shifting process of the transmitting apparatus E at the time of transmitting a path message according to the first embodiment.

As depicted in FIG. 9, when it is determined based on the transmitted and received signaling message that the own node is the endpoint node ("Yes" at step S301), the transmitting apparatus E transmits a signaling message added with the object information to the upper adjacent node (step S302).

Specifically, in the example above, the transmitting apparatus E compares the node ID "5.5.5.5" of the endpoint node specified in an EXPLICIT_ROUTE object of the received path message transmitted from the transmitting apparatus C and the node ID "5.5.5.5" of the transmitting apparatus E to determine that the own node (transmitting apparatus E) is the endpoint node.

Figures 10, 11:
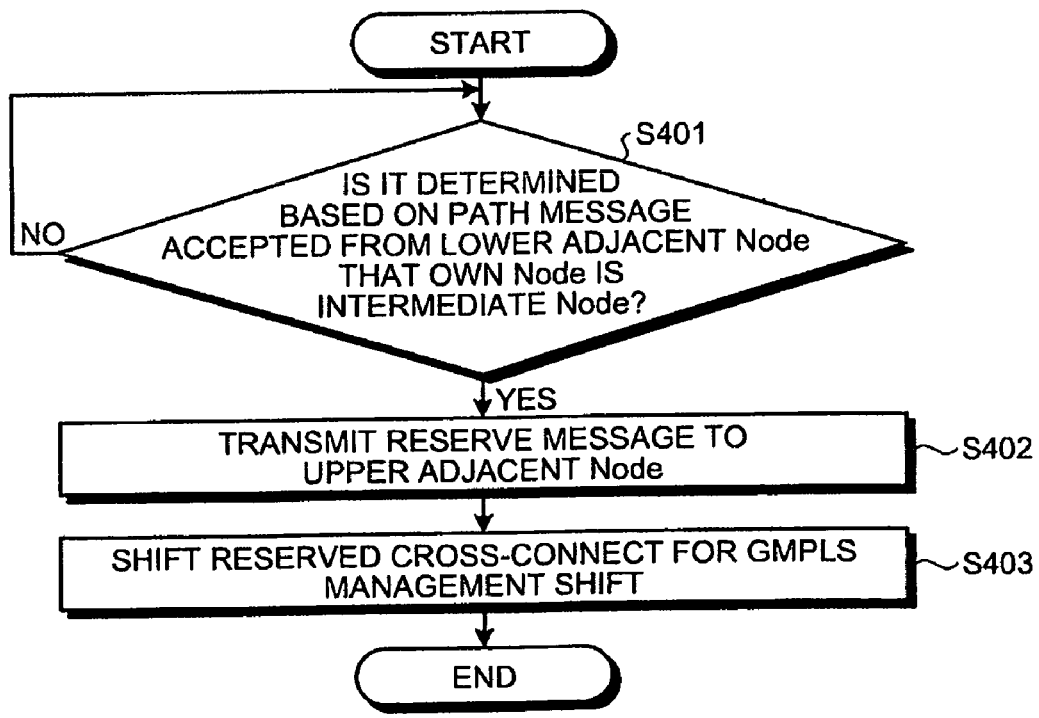
FIG. 10 depicts an example of object information when the transmitting apparatus E according to the first embodiment transmits a reserve message.
FIG. 11 is a flowchart of a GMPLS management shifting process of the transmitting apparatus C at the time of receiving a reserve message according to the first embodiment.

Then, the transmitting apparatus E transmits, to the transmitting apparatus C, which is an upper adjacent node, a signaling message added with object information formed of the link IDs and Ch information on the output side of the transmitting apparatuses A and C, which are upper nodes, and the node IDs of the respective upper nodes (refer to FIG. 10) as a reserve message. FIG. 10 depicts an example of object information when the transmitting apparatus E according to the first embodiment transmits a reserve message.

Then, the transmitting apparatus E obtains cross-connect information of the own node from the cross-connect information retained in a predetermined storage unit (step S303), and causes the obtained cross-connect information to be shifted under GMPLS management (step S304).

In the example above, specifically, the transmitting apparatus E obtains, from the existing-path-information database 121 retained in the transmitting apparatus E, the link ID "100" and Ch information "1" of the cross-connect information on the input side of the transmitting apparatus E and the link ID "1" and Ch information "49" of the cross-connect information on the output side of the transmitting apparatus E as cross-connect information for GMPLS management shift in the transmitting apparatus E.

Then, the transmitting apparatus E updates the obtained link ID "100" and Ch information "1" of the cross-connect information on the input side of the transmitting apparatus E and the obtained link ID "20" and Ch information "1" of the cross-connect information on the output side of the transmitting apparatus E as a cross-connect for GMPLS management shift in the transmitting apparatus E, and then causes the path management under the existing path management to be shifted to be under GMPLS path management.

(GMPLS Management Shifting Process of the Intermediate Node at the Time of Receiving a Reserve Message)

Next, by using FIG. 11, a GMPLS management shifting process of the intermediate node at the time of receiving a reserve message according to the first embodiment is explained. FIG. 11 is a flowchart of a GMPLS management shifting process of the transmitting apparatus C at the time of receiving a reserve message according to the first embodiment.

As depicted in FIG. 11, when it is determined based on the transmitted and received signaling message that the own node is an intermediate node ("Yes" at step S401), the transmitting apparatus C transmits the signaling message added with object information to an upper adjacent node (step S402), and also causes the reserved cross-connect for GMPLS management shift to be shifted to be under GMPLS management (step S403).

In the example above, specifically, based on object information formed of the link ID and Ch information on the output side of each node of the received reserve message transmitted by the transmitting apparatus E and node ID uniquely identifying each node, the transmitting apparatus C determines that the own node (transmitting apparatus C) is an intermediate node.

Then, the transmitting apparatus C transmits a reserve message added with the object information to the transmitting apparatus A, which is an upper adjacent node. Subsequently, the transmitting apparatus C updates the link ID "2" and Ch information "1" of the cross-connect information on the input side of the transmitting apparatus C and the link ID "20" and Ch information "1" of the cross-connect information on the output side of the transmitting apparatus C as a cross-connect for GMPLS management shift reserved at the time of receiving a path message to cause the path management under the existing path management to be shifted to be under GMPLS path management.

(GMPLS Management Shifting Process of the Start-Point Node at the Time of Receiving a Reserve Message)

Figure 12:
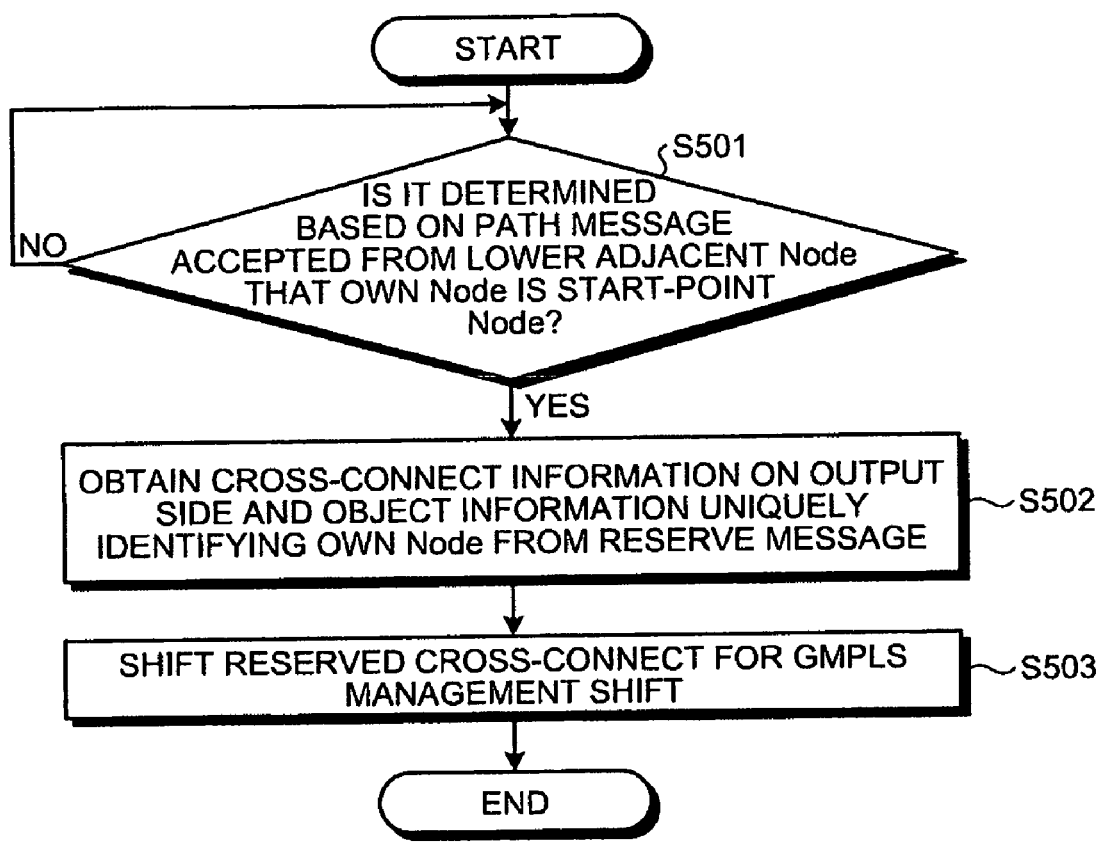
FIG. 12 is a flowchart of a GMPLS management shifting process of the transmitting apparatus A at the time of receiving a reserve message according to the first embodiment.

Next, with reference to FIG. 12, a GMPLS management shifting process of the start-point node at the time of receiving a reserve message according to the first embodiment is explained. FIG. 12 is a flowchart of a GMPLS management shifting process of the transmitting apparatus A at the time of receiving a reserve message according to the first embodiment.

As depicted in FIG. 12, when it is determined based on the transmitted and received signaling message that the own node is the start-point node ("Yes" at step S501), the transmitting apparatus A obtains object information from the accepted signaling message (step S502), and also causes the reserved cross-connect for GMPLS management shift to be shifted to be under GMPLS management (step S503).

In the example above, specifically, based on object information formed of the link ID and Ch information on the output side of each node of the received reserve message transmitted from the transmitting apparatus C and the node ID uniquely identifying each node, the transmitting apparatus A determines that the own node (transmitting apparatus A) is the start-point node.

Then, the transmitting apparatus A obtains, from the reserve message, object information formed of the link ID and Ch information on the output side of each node and the node ID uniquely identifying each node. Subsequently, the transmitting apparatus A updates the link ID "3" and Ch information "49" of the cross-connect information on the input side of the transmitting apparatus A and the link ID "5" and Ch information "1" of the cross-connect information on the output side of the transmitting apparatus A as a cross-connect for GMPLS management shift reserved at the time of receiving a path message to cause the path management under the existing path management to be shifted to be under GMPLS management.

Figure 13:
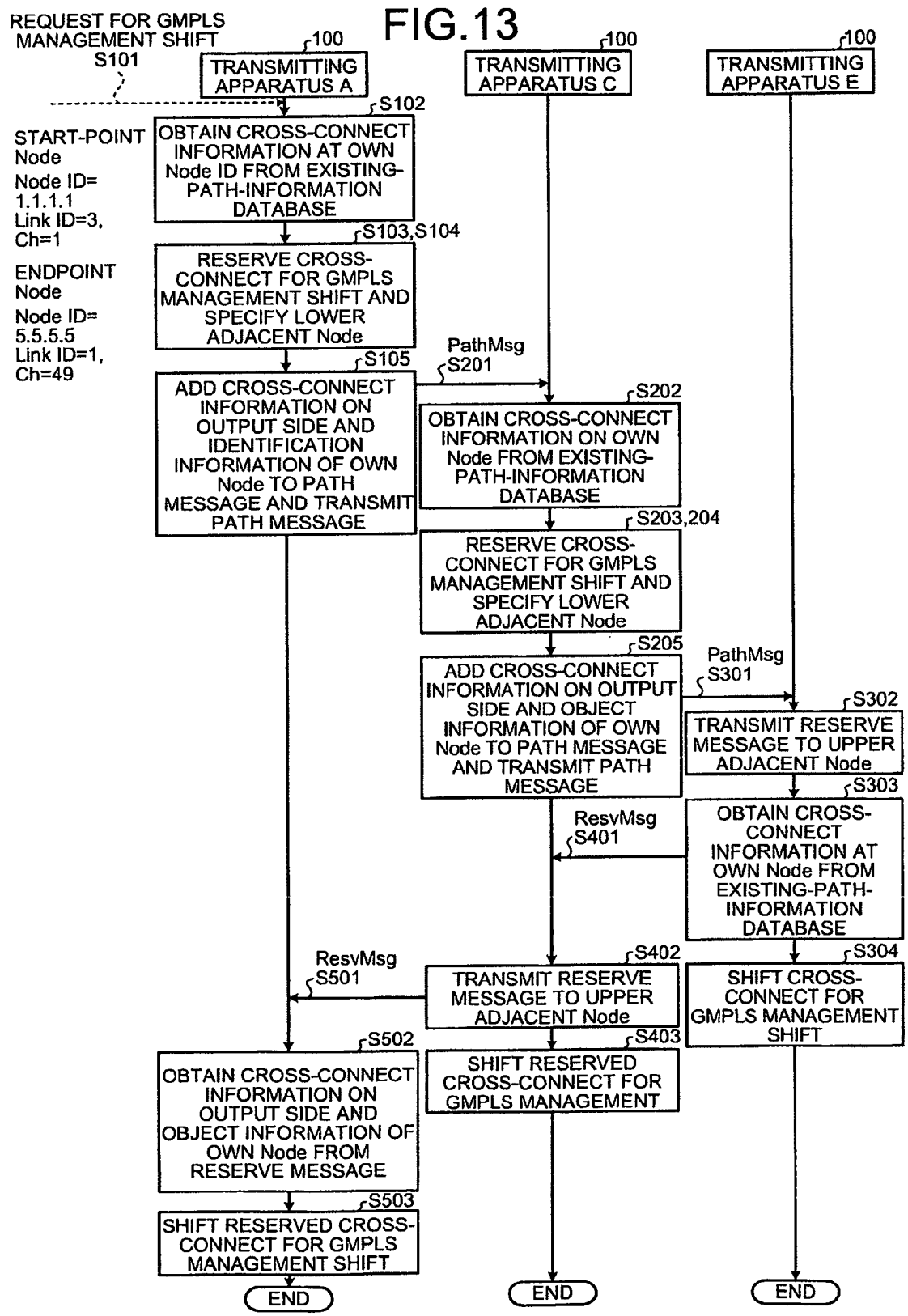
FIG. 13 is a diagram of a sequence of a GMPLS management shifting process among the transmitting apparatuses according to the first embodiment.

Sequence of a Path Management Shifting Process among Nodes According to the First Embodiment Next, by using FIG. 13, a sequence of a GMPLS management shifting process among transmitting apparatuses according to the first embodiment is explained. FIG. 13 is a diagram of a sequence of a GMPLS management shifting process among the transmitting apparatuses according to the first embodiment.

As depicted in FIG. 13, the transmitting apparatus A accepts, as a GMPLS management shift request indicative of a request by the network manager for causing cross-connect information to be shifted to be under GMPLS management, the node ID "1.1.1.1" and input-side link ID "3" of the transmitting apparatus A serving as the start-point node, input-side Ch information "49", the node ID "5.5.5.5" and output-side link ID "1" of the transmitting apparatus E as the endpoint node, and output-side Ch information "49" (step S101).

Then, the transmitting apparatus A accepting the GMPLS management shift request obtains, from the existing-path-information database 121 retained in the transmitting apparatus A, the link ID "3" and Ch information "49" of the cross-connect information on the input side of the transmitting apparatus A and the link ID "5" and Ch information "1" of the cross-connect information on the output side of the transmitting apparatus A, as cross-connect information for GMPLS management shift in the transmitting apparatus A (step S102).

Subsequently, the transmitting apparatus A reserves the obtained link ID "3" and Ch information "49" of the cross-connect information on the input side of the transmitting apparatus A and the obtained link ID "5" and Ch information "1" of the cross-connect information on the output side of the transmitting apparatus A as a cross-connect for GMPLS management shift in the transmitting apparatus A (step S103).

Thereafter, when the cross-connect for GMPLS management shift is reserved, the transmitting apparatus A searches the existing-path-information database 121 for link information (node-A link ID "5", facing-node ID "3.3.3.3", node IP "10.5.20.13", and link ID "2") in the transmitting apparatus A that matches the link ID "5" of the cross-connect information on the output side to specify the transmitting apparatus C, which is an adjacent lower node serving as a transmission destination of a path message (step S104).

Then, the transmitting apparatus A adds, to a path message, object information formed of the link ID "5" and Ch information "1" of the cross-connect information on the output side of the transmitting apparatus A and the node ID "1.1.1.1" uniquely identifying the transmitting apparatus A, and then transmits the path message to the transmitting apparatus C, which is a specified lower adjacent node (step S105).

Subsequently, the transmitting apparatus C compares the node ID "5.5.5.5" of the endpoint node specified in an EXPLICIT_ROUTE object of the path message accepted from the transmitting apparatus A and the node ID "3.3.3.3" of the transmitting apparatus C to determine that the own node (transmitting apparatus C) is an intermediate node (step S201).

Thereafter, the transmitting apparatus C obtains, from the existing-path-information database 121 retained in the transmitting apparatus C, the link ID "2" and the Ch information "1" of the cross-connect information on the input side of the transmitting apparatus C and the link ID "20" and the Ch information "1" of the cross connect information on the output side of the transmitting apparatus C (step S202).

Then, the transmitting apparatus C reserves the obtained link ID "2" and the Ch information "1" of the cross-connect information on the input side of the transmitting apparatus C and the obtained link ID "20" and the Ch information "1" of the cross connect information on the output side of the transmitting apparatus C as a cross-connect for GMPLS management shift in the transmitting apparatus C (step S203).

Subsequently, when the cross-connect for GMPLS management shift is reserved, the transmitting apparatus C searches the existing-path-information database 121 for a link (node-C link ID "20", facing-node ID "5.5.5.5", node IP "10.5.20.15", and link ID "100") in the transmitting apparatus C that matches the link ID "20" of the cross-connect information on the output side to specify the transmitting apparatus E, which is a lower adjacent node serving as a transmission destination of a path message (step S204).

Thereafter, the transmitting apparatus C adds, to a path message, object information formed of the link ID "20" and the Ch information "1" of the cross connect information on the output side of the transmitting apparatus C and the node ID "3.3.3.3" uniquely identifying the transmitting apparatus C, and then transmits the path message to the transmitting apparatus E, which is the specified lower adjacent node (step S205).

Then, the transmitting apparatus E compares the node ID "5.5.5.5" of the endpoint node specified in an EXPLICIT_ROUTE object of the received path message transmitted from the transmitting apparatus C and the node ID "5.5.5.5" of the transmitting apparatus E to determine that the own node (transmitting apparatus E) is the endpoint node (step S301).

Subsequently, the transmitting apparatus E transmits, to the transmitting apparatus C, which is an upper adjacent node, a signaling message added with object information formed of the link IDs and Ch information on the output side of the transmitting apparatuses A and C, which are upper nodes, and the node IDs of the respective upper nodes as a reserve message (step S302).

Thereafter, the transmitting apparatus E obtains, from the existing-path-information database 121 retained in the transmitting apparatus E, the link ID "100" and Ch information "1" of the cross-connect information on the input side of the transmitting apparatus E and the link ID "1" and Ch information "49" of the cross-connect information on the output side of the transmitting apparatus E as cross-connect information for GMPLS management shift in the transmitting apparatus E (step S303).

Then, the transmitting apparatus E updates the obtained link ID "100" and Ch information "1" of the cross-connect information on the input side of the transmitting apparatus E and the obtained link ID "20" and Ch information "1" of the cross-connect information on the output side of the transmitting apparatus E as a cross-connect for GMPLS management shift in the transmitting apparatus E, and then causes the path management under the existing path management to be shifted to be under GMPLS path management (step S304).

Subsequently, based on object information formed of the link ID and Ch information on the output side of each node of the received reserve message transmitted by the transmitting apparatus E and node ID uniquely identifying each node, the transmitting apparatus C determines that the own node (transmitting apparatus C) is an intermediate node (step S401).

Thereafter, the transmitting apparatus C transmits a reserve message added with the object information to the transmitting apparatus A, which is an adjacent upper node (step S402). Then, the transmitting apparatus C updates the link ID "2" and Ch information "1" of the cross-connect information on the input side of the transmitting apparatus C and the link ID "20" and Ch information "1" of the cross-connect information on the output side of the transmitting apparatus C as a cross-connect for GMPLS management shift reserved at the time of receiving a path message to cause the path management under the existing path management to be shifted to be under GMPLS path management (step S403).

Subsequently, based on object information formed of the link ID and Ch information on the output side of each node of the received reserve message transmitted from the transmitting apparatus C and the node ID uniquely identifying each node, the transmitting apparatus A determines that the own node (transmitting apparatus A) is the start-point node (step S501).

Thereafter, the transmitting apparatus A obtains, from the reserve message, object information formed of the link ID and Ch information on the output side of each node and the node ID uniquely identifying each node (step S502). Then, the transmitting apparatus A updates the link ID "3" and Ch information "49" of the cross-connect information on the input side of the transmitting apparatus A and the link ID "5" and Ch information "1" of the cross-connect information on the output side of the transmitting apparatus A as a cross-connect for GMPLS management shift reserved at the time of receiving a path message to cause the path management under the existing path management to be shifted to be under GMPLS management (step S503).

As such, according to the first embodiment, when the existing path manually set by the network manager or the like is shifted to be under GMPLS path management, the transmitting apparatus A 100 reserves cross-connect information as a cross-connect for GMPLS management shift, adds, to a path message, object information formed of the cross-connect information on the output side of the own node and identification information uniquely identifying the own node, and transmits the path message. While transmitting a reserve message, the transmitting apparatus A 100 updates the reserved cross-connect for GMPLS management shift to cause the path management under the existing path management to be shifted to be under GMPLS path management. With this, the existing path can be shifted to be under GMPLS management without cutting off a network service.

For example, the transmitting apparatus A 100 reserves the cross-connect information on the input and output sides of the own node as a cross-connect for GMPLS management shift. Then, the transmitting apparatus A 100 adds, to a path message, object information formed of the cross-connect information on the output side of the own node and the node ID of the own node, and then transmits the path message to a lower adjacent node. Subsequently, when the transmitting apparatus A 100 is the endpoint node, the transmitting apparatus A 100 transmits the received path message to an upper adjacent node as a reserve message. Thereafter, the transmitting apparatus A 100 updates the cross-connect for GMPLS management shift reserved at the time of transmitting a path message to cause the path management under the existing path management to be shifted to be under GMPLS path management. As a result, the transmitting apparatus A 100 can cause the existing path to be shifted to be under GMPLS management without cutting off a network service.

Second Embodiment

Meanwhile, in the first embodiment, the case has been explained in which the cross-connect for GMPLS management shift is reserved and shifted for a unidirectional path in a GMPLS management shifting process. However, the present invention is not meant to be restricted to this. Alternatively, the target for GMPLS management shift in a GMPLS management shifting process can be reserved and shifted for a bidirectional path.

Figure 14:
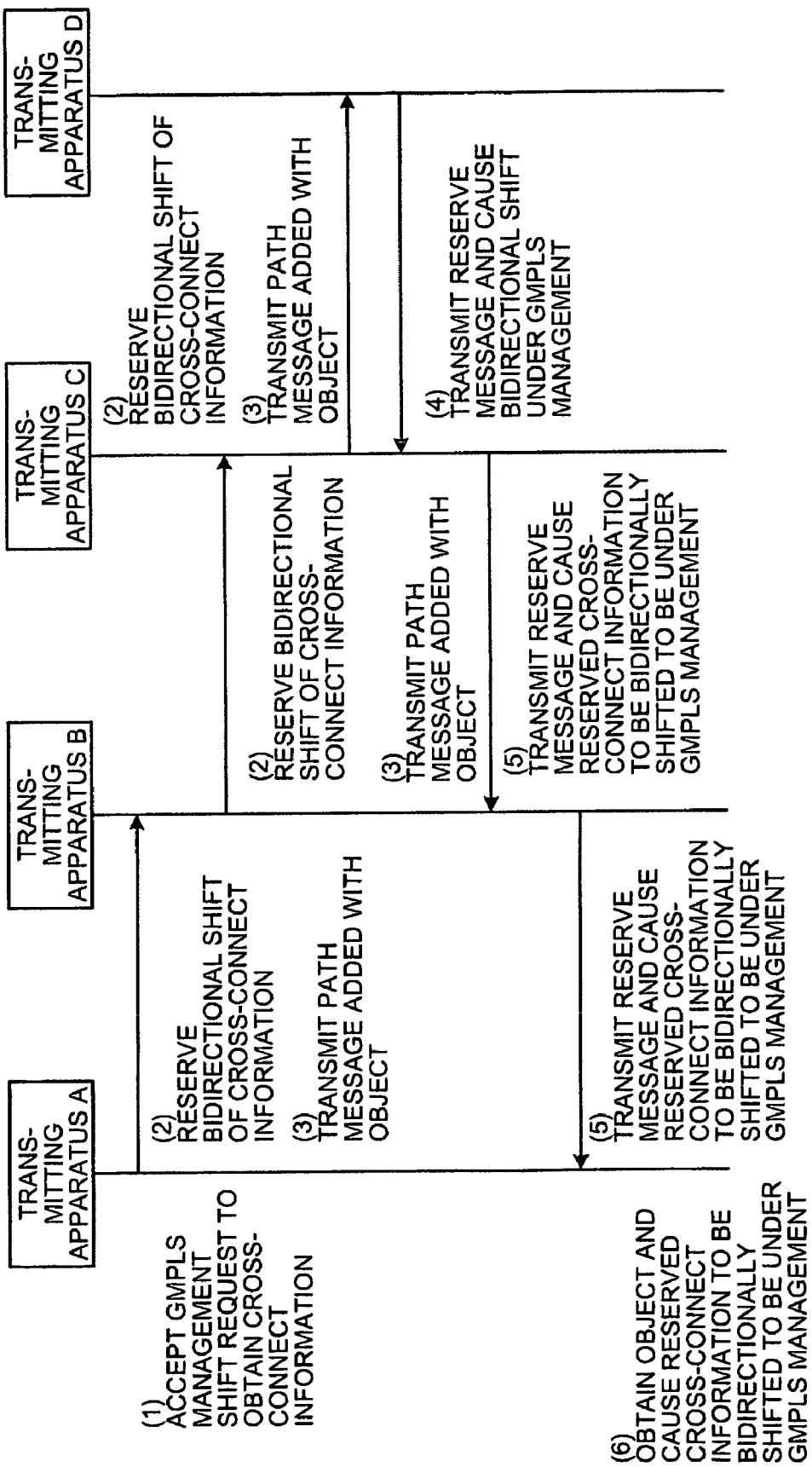
FIG. 14 is a diagram for explaining the case where a target for GMPLS management shift in a GMPLS management shifting process according to a second embodiment is bidirectionally reserved and shifted.

For this purpose, in a second embodiment below, by using FIG. 14, a GMPLS management shifting process according to the second embodiment is explained. FIG. 14 is a diagram for explaining the case where a target for GMPLS management shift in a GMPLS management shifting process according to the second embodiment is bidirectionally reserved and shifted. Note that the configurations and functions of the transmitting apparatus according to the second embodiment and a network including the transmitting apparatus according to the second embodiment are similar to those according to the first embodiment, and therefore are not explained herein.

GMPLS management shifting process in a bidirectional path

As depicted in FIG. 14, when accepting a GMPLS management shift request indicative of a request by the network manager for causing cross-connect information to be shifted to be under GMPLS management, the transmitting apparatus obtains, from a predetermined storage unit, cross-connect information on input and output sides of the own node for GMPLS management (refer to (1) in FIG. 14).

Specifically, for example, as a request for causing by the network manager for causing the existing cross-connect information to be shifted to be under GMPLS management, the transmitting apparatus A accepts own-node information and cross-connect information of the transmitting apparatus A as the start-point node and the transmitting apparatus D as the endpoint node. Then, the transmitting apparatus A accepting the GMPLS management shift request obtains, from the retained existing-path-information, cross-connect information on input and output sides of the transmitting apparatus A as cross-connect information for GMPLS management shift in the transmitting apparatus A.

Then, the transmitting apparatus reserves the obtained cross-connect information as a bidirectional cross-connect for GMPLS management shift (refer to (2) in FIG. 14). In the example above, specifically for instance, the transmitting apparatus A reserves the obtained cross-connect information on input and output sides of the transmitting apparatus A as a cross-connect for GMPLS management shift in the transmitting apparatus A in a direction in which the transmitting apparatus A is taken as an upper node and the transmitting apparatus D is taken as a lower node and in a direction in which the transmitting apparatus D is taken as an upper node and the transmitting apparatus A is taken as a lower node. That is, the transmitting apparatus A reserves the obtained cross-connect information on input and output sides of the transmitting apparatus A as a cross-connect for GMPLS management shift in one direction, and also reserves cross-connect information in which the input side in one direction is taken as an output side and the output side in the one direction is taken as an input side, in a direction reverse to the one direction as the cross-connect for GMPLS management shift, thereby making reservations for GMPLS management shift bidirectionally.

Subsequently, when the cross-connect for GMPLS management shift is reserved bidirectionally, the transmitting apparatus specifies a lower adjacent node serving as a transmission destination of a signaling message from link information retained in a predetermined storage unit, adds, to the signaling message, first object information formed of cross-connect information on the output side of the own node and identification information uniquely identifying the own node and second object information formed of cross-connect information on the input side of the own node and identification information uniquely identifying the own node, and then transmits the signaling message to the specified lower adjacent node (refer to (3) in FIG. 14).

In the example above, specifically for instance, when the cross-connect for GMPLS management shift is reserved bidirectionally, the transmitting apparatus A searches the existing path information for link information in the own node that matches the cross-connect information on the output side to specify a lower adjacent node (transmitting apparatus B) serving as a transmission destination of a path message. Then, the transmitting apparatus A adds, to the path message, object information formed of the cross-connect information on the output side of the transmitting apparatus A and the identification information uniquely identifying the transmitting apparatus A and object information formed of the cross-connect information on the input side of the transmitting apparatus A and the identification information uniquely identifying the transmitting apparatus A, and then transmits the path message to the transmitting apparatus B, which is the specified lower adjacent node.

Thereafter, the transmitting apparatus B compares identification information of the endpoint node specified in an EXPLICIT_ROUTE object of the path message received from the transmitting apparatus A and identification information of the own node (transmitting apparatus B) to determine that the own node (transmitting apparatus B) is an intermediate node. The transmitting apparatus B then obtains, from the existing-path information retained in the transmitting apparatus B, cross-connect information on input and output sides of the transmitting apparatus B. Subsequently, the transmitting apparatus B reserves the obtained cross-connect information on the input and output sides of the transmitting apparatus B as a cross-connect for GMPLS management shift in the transmitting apparatus B in a manner similar to that of the transmitting apparatus A. Thereafter, when the cross-connect for GMPLS management shift is reserved bidirectionally, the transmitting apparatus B searches the existing path information for link information in the own node that matches the cross-connect information on the output side to specify a lower adjacent node (transmitting apparatus C) serving as a transmission destination of a path message. Then, the transmitting apparatus B adds, to a path message, object information formed of the cross-connect information on the output side of the transmitting apparatus B and identification information uniquely identifying the transmitting apparatus B and object information formed of the cross-connect information on the input side of the transmitting apparatus B and the identification information of the transmitting apparatus B, and then transmits the path message to the transmitting apparatus C, which is the specified lower adjacent node.

Subsequently, the transmitting apparatus C performs a process similar to that of the transmitting apparatus B to obtain cross-connect information on input and output sides in the transmitting apparatus C, reserve as a bi-directional cross-connect for GMPLS management shift in the transmitting apparatus C, add, to a path message, two pieces of object information formed of cross-connect information on input and output sides in the transmitting apparatus C and identification information uniquely identifying the transmitting apparatus c, and then transmit the path message to the transmitting apparatus D, which is a lower adjacent node.

Thereafter, when it is determined based on the transmitted and received signaling message that the own node is the endpoint node, the transmitting apparatus transmits a signaling message added with the first and second object information to an upper adjacent node, and obtains cross-connect information of the own node from the cross-connect information retained in a predetermined storage unit to cause the obtained cross-connect information to be shifted to be under GMPLS management bidirectionally (refer to (4) of FIG. 14).

In the example above, specifically for instance, the transmitting apparatus D compares identification information of the endpoint node specified in an EXPLICIT_ROUTE object of the path message transmitted to and received by the transmitting apparatus C, which is an upper adjacent node and identification information of the own node to determine that the own node (transmitting apparatus D) is the endpoint node.

Then, the transmitting apparatus D transmits to the transmitting apparatus C, which is an upper adjacent node, a signaling message added with object information formed of cross-connect information on input and output sides of each upper node and identification information uniquely identifying each upper node, as a reserve message. Subsequently, the transmitting apparatus D obtains cross-connect information on input and output sides of the transmitting apparatus D, updates as a bidirectional cross-connect for GMPLS management shift in the transmitting apparatus D, and causes the path management under the existing path management to be shifted to be under path management with GMPLS.

Then, when it is determined based on the transmitted and received signaling message that the own node is an intermediate node, the transmitting apparatus transmits to an upper adjacent node a signaling message added with the first object information and the second object information, and also causes the reserved bidirectional cross-connect for GMPLS management shift under the existing path management to be shifted to be under GMPLS management (refer to (5) in FIG. 14).

In the example above, specifically for instance, based on two pieces of object information formed of the cross-connect information of the reserve message transmitted to and received by the transmitting apparatus D, which is a lower adjacent node, on input and output sides of each node and identification information uniquely identifying each node, the transmitting apparatus C determines that the own node (transmitting apparatus C) is an intermediate node. Then, the transmitting apparatus C transmits to the transmitting apparatus B, which an upper adjacent node, a signaling message added with object information of each node as a reserve message. Subsequently, the transmitting apparatus C updates the cross-connect for GMPLS management shift reserved bidirectionally at the time of receiving the path message to cause the path management under the existing path management to be shifted to be under GMPLS management.

Thereafter, when receiving a reserve message from the transmitting apparatus C, the transmitting apparatus B performs a process similar to that of the transmitting apparatus C, transmits to the transmitting apparatus A, a signaling message added with two pieces of object information formed of the cross-connect information on input and output sides of each node and the identification information uniquely identifying each node as a reserve message. Then, the transmitting apparatus B updates the cross-connect for GMPLS management shift reserved bidirectionally at the time of receiving the path message to cause the path management under the existing path management to be shifted to be under GMPLS management.

Subsequently, when it is determined based on the transmitted and received signaling message that the own node is the start-point node, the transmitting apparatus obtains the first object information and the second object information from the accepted signaling message, and causes the cross-connect for GMPLS management shift reserved bidirectionally to be shifted to be under GMPLS management (refer to (6) in FIG. 14).

In the example above, specifically for instance, the transmitting apparatus A determines based on two pieces of object information formed of the cross-connect information on input and output sides of each node of the reserve message transmitted to and received by the transmitting apparatus B, which is a lower adjacent node and identification information uniquely identifying each node that the own node (transmitting apparatus A) is the start-point node. Then, the transmitting apparatus A obtains object information from the reserve message. Subsequently, the transmitting apparatus A updates the cross-connect for GMPLS management shift reserved bidirectionally at the time of transmitting the path message to cause the path management under the existing path management to be shifted to be under GMPLS path management.

As such, according to the second embodiment, the transmitting apparatus reserves a cross-connect for GMPLS management shift bidirectionally at the time of transmitting a path message. Therefore, path settings can be quickly performed bidirectionally.

Third Embodiment

Meanwhile, while the embodiments of the present invention have been explained, the present invention can be implemented in various different embodiments other than those explained above. Thus, an embodiment different in (1) configuration of the transmitting apparatus, (2) GMPLS management shifting process, and (3) program is now explained.

(1) Configuration of the Transmitting Apparatus

Also, the process procedure, the control procedure, specific names, and information including various data and parameters (for example, information stored in "the existing-path-information database 121" depicted in FIG. 2, an object added to a signaling message, and identification information uniquely identifying each node) can be arbitrarily changed unless otherwise specified.

Furthermore, each component depicted is conceptual in function, and is not necessarily physically configured as depicted. That is, the specific patterns of distribution and unification of the components are not meant to be restricted to those depicted in the diagrams. All or part of the components can be functionally or physically distributed or unified in arbitrary units according to various loads and the state of use to construct. For example, the management shifting unit 135c can be distributed into a first management shifting unit, a second management shifting unit, and a third management shifting unit. Still further, all or arbitrary part of the process function performed in each component can be achieved by a CPU and a program analyzed and executed on that CPU, or can be achieved as hardware with a wired logic.

Still further, in the first and second embodiments, the case has been explained such that the path management is shifted by each transmitting apparatus in the network having the start-point node, a plurality of (or single) intermediate nodes, and the endpoint node. However, this is not meant to be restrictive. Alternatively, the path management may be shifted by two transmitting apparatuses, that is, the start-point node and the endpoint node.

For example, in the case of a network having two transmitting apparatuses, that is, a start-point node X and an endpoint node Y, a shift reservation of the path management is performed at the start-point node X, and then a signaling message (path message) is transmitted to the endpoint node Y. Then, the endpoint node Y receiving the signaling message (path message) from the start-point node X causes the path management to be shifted to be under GMPLS management, and then transmits a signaling message (reserve message) to the start-point node X. Subsequently, the start-point node X receiving the signaling message (reserve message) from the endpoint node Y causes the shift-reserved path management to be shifted to be under GMPLS management.

(2) GMPLS Management Shifting Process

Also, in the first embodiment, the case has been explained such that the path management is shifted for a unidirectional path. However, this is not meant to be restrictive. Alternatively, after the path management is shifted for a unidirectional path, a similar process is performed in a reverse direction, thereby shifting the path management also in a reverse direction.

For example, from the transmitting apparatus A to the transmitting apparatus D, a path message and a reserve message are transmitted for shifting the path management for a unidirectional path. Then, from the transmitting apparatus D to the transmitting apparatus A, a path message and a reserve message are transmitted for shifting the path management in the other direction. As a result, the path management can be shifted bidirectionally.

(3) Program

Figure 15:
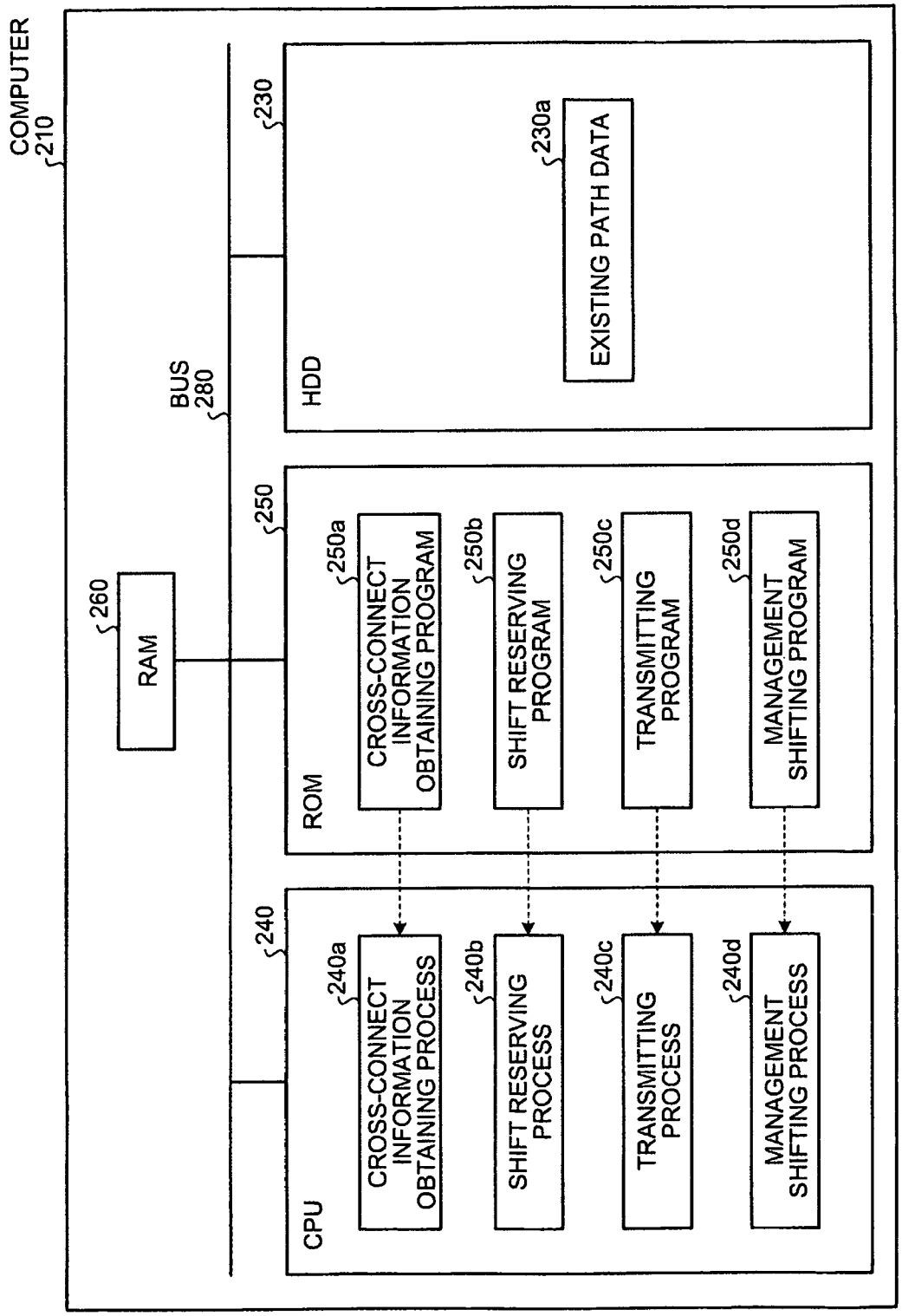
FIG. 15 is a diagram of a computer that executes a transmitting program.

Meanwhile, in the embodiments, the case has been explained such that various processes are achieved by hardware logic. However, this is not meant to be restrictive. Alternatively, various processes may be achieved by a program prepared in advance being executed on a computer. By using FIG. 15, one example of a computer that executes a transmitting program having functions similar to those of the transmitting apparatus in the embodiments is explained. FIG. 15 is a diagram of the computer that executes the transmitting program.

As depicted in FIG. 15, a computer 210 as a transmitting apparatus has a hard disk drive (HDD) 230, a CPU 240, a read-only memory (ROM) 250, and a random-access memory (RAM) 260 connected thereamong with a bus 280 or the like.

In the ROM 250, a transmitting program achieving functions similar to those of the transmitting apparatus 100 in the first embodiment is stored in advance, including, as depicted in FIG. 15, a cross-connect information obtaining program 250a, a shift reserving program 250b, a transmitting program 250c, and a management shifting program 250d. Note that, as with the components of the transmitting apparatus 100 depicted in FIG. 2, these programs 250a to 250d may be unified or distributed as appropriate.

With these programs 250a to 250d being read by the CPU 240 for execution, as depicted in FIG. 15, the programs 250a to 250d function as a cross-connect information obtaining process 240a, a shift reserving process 240b, a transmitting process 240c, and a management shifting process 240d, respectively. Note that the processes 240a to 240d correspond to the command processor 124, the shift reserving unit 135a, the message transmitting and receiving unit 135b, and the management shifting unit 135c, respectively.

The CPU 240 executes the transmitting program based on existing path data 230a recorded in the RAM 260.

Note that these programs 250a to 250d are not necessarily stored from the start in the ROM 250 and, for example, each of these programs may be stored in a "portable physical medium", such as a flexible disk (FD), a compact-disk read only memory (CD-ROM), a digital versatile disk (DVD), a magneto-optical disk, an integrated-circuit (IC) card inserted in the computer 210; a "fixed physical medium", such as a HDD provided internally or externally of the computer 210; or further "another computer (or server)" connected to the computer 210 via a public line, the Internet, LAN, WAN, or the like, and then may be read therefrom by the computer 210 for execution.

According to the transmitting apparatus, an effect can be achieved such that network service can be continuously provided when the existing path is shifted to be under GMPLS management.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A transmitting apparatus representing an own node, the transmitting apparatus comprising:
   a shift reserving unit that obtains cross-connect information and reserves input and output route information indicated by the obtained cross-connect information to be shifted to be under the Generalized Multi-Protocol Label Switching (GMPLS) management; and
   a transmitting unit that modifies a signaling message of GMPLS Function by adding object information including identification information uniquely identifying the own node and the output route information indicated by the obtained cross-connect information, and transmits the modified signaling message to a down stream or lower adjacent node.

2. The transmitting apparatus according to claim 1, wherein the shift reserving unit,
   receives a signaling message from an upper adjacent node, the signaling message including the cross-connect information and object information;
   obtains the cross-connect information when it is determined that the own node is an intermediate node based on the received signaling message; and
   reserves the input and output route information indicated by the obtained cross-connect information to be shifted to be under the GMPLS management.

3. The transmitting apparatus according to claim 1, further comprising:
   a management shifting unit that,
      receives a signaling message from an upper adjacent node, the signaling message including the cross-connect information and object information;
      transmits the received signaling message to the upper adjacent node when it is determined that the own node is an endpoint node based on the received signaling message;
      obtains the cross-connect information; and
      causes a route indicated by the obtained cross-connect information to be shifted under the GMPLS management.

4. The transmitting apparatus according to claim 1, wherein the shift reserving unit obtains the cross-connect information at a time of receiving a request for shifting to GMPLS management.

5. The transmitting apparatus according to claim 1, further comprising:
   a management shifting unit that,
      receives a signaling message from a lower adjacent node:
      transmits the received signaling message to a upper adjacent node when it is determined that the own node is an intermediate node based on the received signaling message; and
      causes a cross-connect to be shifted, indicating a route shift-reserved by the shift reserving unit to be shifted to be under the GMPLS management.

6. The transmitting apparatus according to claim 1, further comprising:
   a management shifting unit that,
      receives a signaling message from a lower adjacent node; and
      causes a cross-connect to be shifted, indicating a route shift-reserved by the shift reserving unit to be shifted to be under the GMPLS management when it is determined that the own node is a start-point node based on the received signaling message.

7. A transmitting apparatus representing an own node, the transmitting apparatus comprising:
   a shift reserving unit that obtains cross-connect information and reserves input and output route information indicated by the obtained cross-connect information as a bidirectional cross-connect to be shifted to be under the Generalized Multi-Protocol Label Switching (GMPLS) management; and
   a transmitting unit that modifies a signaling message of GMPLS Function by adding object information including identification information uniquely identifying the own node and the input and output route information indicated by the obtained cross-connect information, and transmits the modified signaling message to a down stream or lower adjacent node.

8. The transmitting apparatus according to claim 7, wherein
   the shift reserving unit, receives a signaling message from an upper adjacent node, the signaling message including the cross-connect information and object information;

obtains the cross-connect information when it is determined that the own node is an intermediate node based on the received signaling message; and bidirectionally reserves the input and output route information indicated by the obtained cross-connect information to be shifted to be under the GMPLS management.

9. The transmitting apparatus according to claim 7, further comprising:

a management shifting unit that, receives a signaling message from an upper adjacent node, the signaling message including the cross-connect information and object information;

transmits the received signaling message to the upper adjacent node when it is determined that the own node is an endpoint node based on the received signaling message;

obtains the cross-connect information; and causes a route indicated by the obtained cross-connect information to be shifted under the GMPLS management.

10. The transmitting apparatus according to claim 7, wherein the shift reserving unit obtains the cross-connect information at a time of receiving a request for shifting to GMPLS management.

11. The transmitting apparatus according to claim 7, further comprising:

a management shifting unit that, receives a signaling message from a lower adjacent node;

transmits the received signaling message to a upper adjacent node when it is determined that the own node is an intermediate node based on the received signaling message; and causes a cross-connect to be shifted, indicating a route shift-reserved by the shift reserving unit to be shifted to be under the GMPLS management.

12. The transmitting apparatus according to claim 7, further comprising:

a management shifting unit that, receives a signaling message from a lower adjacent node; and causes a cross-connect to be shifted, indicating a route shift-reserved by the shift reserving unit to be shifted to be under the GMPLS management when it is determined that the own node is a start-point node based on the received signaling message.

13. A transmitting method performed by a transmitting apparatus representing an own node, the transmitting method comprising:

a shift reserving step of obtaining cross-connect information, and reserving input and output route information indicated by the obtained cross-connect information to be shifted to be under the Generalized Multi-Protocol Label Switching (GMPLS) management; and a transmitting step of modifying a signaling message of GMPLS Function by adding object information including identification information uniquely identifying the own node and the output route information indicated by the obtained cross-connect information, and transmitting the modified signaling message to a down stream or lower adjacent node.

14. The transmitting method according to claim 13, wherein the shift reserving step, receives a signaling message from an upper adjacent node, the signaling message including the cross-connect information and object information;

obtains the cross-connect information when it is determined that the own node is an intermediate node based on the received signaling message; and reserves the input and output route information indicated by the obtained cross-connect information to be shifted to be under the GMPLS management.

15. The transmitting method according to claim 13, further comprising:

a management shifting step of, receiving a signaling message from an upper adjacent node, the signaling message including the cross-connect information and object information;

transmitting the received signaling message to the upper adjacent node when it is determined that the own node is an endpoint node based on the received signaling message;

obtaining the cross-connect information; and causing a route indicated by the obtained cross-connect information to be shifted under the GMPLS management.

16. The transmitting method according to claim 13, wherein the shift reserving step obtains the cross-connect information at a time of receiving a request for shifting to GMPLS management.

17. The transmitting method according to claim 13, further comprising:

a management shifting step of, receiving a signaling message from a lower adjacent node;

transmitting the received signaling message to a upper adjacent node when it is determined that the own node is an intermediate node based on the received signaling message; and causing a cross-connect to be shifted, indicating a route shift-reserved by the shift reserving unit to be shifted to be under the GMPLS management.

18. The transmitting method according to claim 13, further comprising:

a management shifting step of, receiving a signaling message from a lower adjacent node; and causing a cross-connect to be shifted, indicating a route shift-reserved by the shift reserving unit to be shifted to be under the GMPLS management when it is determined that the own node is a start-point node based on the received signaling message.

* * * * *